(12) United States Patent
Thompson et al.

(10) Patent No.: US 7,666,517 B2
(45) Date of Patent: Feb. 23, 2010

(54) ISOLATION, FORMULATION, AND SHAPING OF MACROCYCLIC OLIGOESTERS

(75) Inventors: Timothy A. Thompson, Dresden (DE); Peter D. Phelps, Schenectady, NY (US); Steven J. Winckler, Troy, NY (US)

(73) Assignee: Cyclics Corporation, Schenectady, NY (US)

( * ) Notice: Subject to any disclaimer, the term of this patent is extended or adjusted under 35 U.S.C. 154(b) by 52 days.

(21) Appl. No.: 11/475,392

(22) Filed: Jun. 27, 2006

(65) Prior Publication Data

US 2007/0037464 A1    Feb. 15, 2007

Related U.S. Application Data

(62) Division of application No. 10/485,921, filed as application No. PCT/US02/20882 on Jun. 26, 2002, now Pat. No. 7,071,291.

(60) Provisional application No. 60/301,399, filed on Jun. 27, 2001.

(51) Int. Cl.
*B32B 27/36* (2006.01)
(52) U.S. Cl. .................... 428/480; 549/266; 528/274; 528/491; 524/494; 524/445
(58) Field of Classification Search ................ 427/512; 502/171; 549/266; 428/480; 528/274, 491; 524/425, 494, 445
See application file for complete search history.

(56) References Cited

U.S. PATENT DOCUMENTS

| | | |
|---|---|---|
| 2,628,171 A | 2/1953 | Green |
| 3,018,272 A | 1/1962 | Griffing et al. |
| 3,090,753 A | 5/1963 | Matuszak et al. |
| 3,786,067 A | 1/1974 | Throckmorton et al. |
| 3,859,246 A | 1/1975 | Jackson, Jr. et al. |
| 3,964,923 A | 6/1976 | Zetmeir |
| 3,979,354 A | 9/1976 | Dyckman et al. |
| 4,012,460 A | 3/1977 | Takahashi |
| 4,063,009 A | 12/1977 | Ziegler et al. |
| 4,075,319 A | 2/1978 | Dyckman et al. |
| 4,082,709 A | 4/1978 | Dyckman et al. |
| 4,101,600 A | 7/1978 | Zhukov et al. |
| 4,115,468 A | 9/1978 | Antonov et al. |
| 4,118,432 A | 10/1978 | Kabanov et al. |
| 4,129,548 A | 12/1978 | McDonnell et al. |
| 4,140,669 A | 2/1979 | Phipps, Jr. et al. |
| 4,165,305 A | 8/1979 | Sundie et al. |
| 4,187,197 A | 2/1980 | Kabanov et al. |
| 4,230,824 A | 10/1980 | Nodelman |
| 4,232,087 A | 11/1980 | Trask |
| 4,233,232 A | 11/1980 | Howarth |
| 4,235,825 A | 11/1980 | Milam |
| 4,341,842 A | 7/1982 | Lampe |
| 4,377,684 A | 3/1983 | Bolon et al. |
| 4,409,266 A | 10/1983 | Wieczorrek et al. |
| 4,461,854 A | 7/1984 | Smith |
| 4,478,963 A | 10/1984 | McGarry |
| 4,518,283 A | 5/1985 | Gebauer et al. |
| 4,520,123 A | 5/1985 | Hall |
| 4,525,565 A | 6/1985 | Laisney et al. |
| 4,535,102 A | 8/1985 | Kusumoto et al. |
| 4,547,531 A | 10/1985 | Waknine |
| 4,559,262 A | 12/1985 | Cogswell et al. |
| 4,568,703 A | 2/1986 | Ashida |
| 4,584,254 A | 4/1986 | Nakayama et al. |
| 4,590,259 A | 5/1986 | Kosky et al. |
| 4,591,624 A | 5/1986 | Hall |
| 4,605,731 A | 8/1986 | Evans et al. |
| 4,616,077 A | 10/1986 | Silva |
| 4,638,077 A | 1/1987 | Brunelle et al. |
| 4,644,053 A | 2/1987 | Brunelle et al. |
| 4,647,633 A | 3/1987 | Kostelnik |
| 4,672,003 A | 6/1987 | Letoffe et al. |
| 4,680,345 A | 7/1987 | Kobayashi et al. |
| 4,725,666 A | 2/1988 | Curatolo et al. |
| 4,727,134 A | 2/1988 | Brunelle et al. |
| 4,740,583 A | 4/1988 | Brunelle et al. |
| 4,757,132 A | 7/1988 | Brunelle et al. |
| 4,785,060 A | 11/1988 | Nagler |
| 4,803,288 A | 2/1989 | Kitamura et al. |
| 4,812,524 A | 3/1989 | Baghdachi |
| 4,816,548 A | 3/1989 | Evans et al. |
| 4,824,595 A | 4/1989 | Richter et al. |
| 4,829,144 A | 5/1989 | Brunelle et al. |
| 4,831,001 A | 5/1989 | Evans et al. |

(Continued)

FOREIGN PATENT DOCUMENTS

BE    676324    6/1966

(Continued)

OTHER PUBLICATIONS

Ahjopalo, L. et al. (2000) "*Cyclic Oligomers in Saturated Polyesters,*" Polymer, vol. 41, No. 23, 8283-8290.

(Continued)

*Primary Examiner*—James Seidleck
*Assistant Examiner*—Gregory Listvoyb
(74) *Attorney, Agent, or Firm*—Goodwin Procter LLP

(57) ABSTRACT

Processes for isolating, formulating, and shaping macrocyclic oligoesters were developed which allow efficient production of macrocyclic oligoesters substantially free from solvent, which may include additives, fillers, and catalysts.

23 Claims, 8 Drawing Sheets

U.S. PATENT DOCUMENTS

| | | |
|---|---|---|
| 4,845,178 A | 7/1989 | Hostetler et al. |
| 4,852,591 A | 8/1989 | Wisotzki et al. |
| 4,880,848 A | 11/1989 | Ghali |
| 4,888,411 A | 12/1989 | Shannon et al. |
| 4,889,885 A | 12/1989 | Usuki et al. |
| 4,900,706 A | 2/1990 | Sasaki et al. |
| 4,904,810 A | 2/1990 | Brunelle et al. |
| 4,909,846 A | 3/1990 | Barfurth et al. |
| 4,927,728 A | 5/1990 | Isoda et al. |
| 4,942,198 A | 7/1990 | Dickerhof et al. |
| 4,960,915 A | 10/1990 | Thiele et al. |
| 4,980,453 A | 12/1990 | Brunelle et al. |
| 4,992,228 A | 2/1991 | Heck et al. |
| 4,994,541 A | 2/1991 | Dell et al. |
| 4,999,420 A | 3/1991 | Leitz et al. |
| 5,006,637 A | 4/1991 | Guggenheim et al. |
| 5,019,450 A | 5/1991 | Cogswell et al. |
| 5,023,346 A | 6/1991 | Schon et al. |
| 5,039,717 A | 8/1991 | Kawakami et al. |
| 5,039,783 A | 8/1991 | Brunelle et al. |
| 5,051,482 A | 9/1991 | Tepic et al. |
| 5,071,711 A | 12/1991 | Heck et al. |
| 5,095,088 A | 3/1992 | Wang |
| 5,097,008 A | 3/1992 | Krabbenhoft et al. |
| 5,116,900 A | 5/1992 | Flautt et al. |
| 5,124,427 A | 6/1992 | Potter et al. |
| 5,159,024 A | 10/1992 | Brindopke et al. |
| 5,175,228 A | 12/1992 | Wang et al. |
| 5,191,013 A | 3/1993 | Cook et al. |
| 5,191,038 A | 3/1993 | Krabbenhoft et al. |
| 5,196,055 A | 3/1993 | Lesney et al. |
| 5,202,386 A | 4/1993 | Hogt et al. |
| 5,207,850 A | 5/1993 | Parekh |
| 5,214,158 A | 5/1993 | Brunelle et al. |
| 5,225,129 A | 7/1993 | van den Berg et al. |
| 5,231,161 A | 7/1993 | Brunelle et al. |
| 5,235,018 A | 8/1993 | Potter et al. |
| 5,237,042 A | 8/1993 | Kim et al. |
| 5,241,880 A | 9/1993 | Mizobata et al. |
| RE34,431 E | 11/1993 | Brunelle et al. |
| 5,260,376 A | 11/1993 | Nakahata et al. |
| 5,264,548 A | 11/1993 | Brunelle et al. |
| 5,281,669 A * | 1/1994 | Kambour et al. ............ 525/177 |
| 5,288,837 A | 2/1994 | Munjal et al. |
| 5,300,392 A | 4/1994 | Odell et al. |
| 5,300,393 A | 4/1994 | Odell et al. |
| 5,300,590 A | 4/1994 | Cook et al. |
| 5,302,484 A | 4/1994 | Odell et al. |
| 5,314,779 A | 5/1994 | Odell et al. |
| 5,321,117 A | 6/1994 | Brunelle |
| 5,340,909 A | 8/1994 | Doerr et al. |
| 5,348,985 A | 9/1994 | Pearce et al. |
| 5,349,040 A | 9/1994 | Trinks et al. |
| 5,350,726 A | 9/1994 | Shaffer |
| 5,350,819 A | 9/1994 | Shaffer |
| 5,356,984 A | 10/1994 | Carbone et al. |
| 5,386,037 A | 1/1995 | Takekoshi et al. |
| 5,387,666 A | 2/1995 | Takekoshi et al. |
| 5,389,719 A | 2/1995 | Takekoshi et al. |
| 5,407,984 A | 4/1995 | Brunelle et al. |
| 5,408,001 A | 4/1995 | Nakahata et al. |
| 5,410,014 A | 4/1995 | Haese et al. |
| 5,418,303 A | 5/1995 | Shaffer |
| 5,420,226 A | 5/1995 | Hamer et al. |
| 5,426,156 A | 6/1995 | Bederke et al. |
| 5,434,244 A | 7/1995 | Warner et al. |
| 5,439,996 A | 8/1995 | Baird et al. |
| 5,444,146 A | 8/1995 | Potter et al. |
| 5,446,122 A | 8/1995 | Warner et al. |
| 5,448,001 A | 9/1995 | Baird et al. |
| 5,466,744 A | 11/1995 | Evans et al. |
| 5,498,651 A | 3/1996 | Brunelle |
| 5,506,316 A | 4/1996 | Shaffer |
| 5,506,328 A | 4/1996 | Chandalia et al. |
| 5,508,343 A | 4/1996 | Holley |
| 5,516,879 A | 5/1996 | Yuo et al. |
| 5,519,108 A | 5/1996 | Yuo et al. |
| 5,525,673 A | 6/1996 | Nakahata et al. |
| 5,527,976 A | 6/1996 | Takekoshi et al. |
| 5,530,052 A | 6/1996 | Takekoshi et al. |
| 5,591,800 A | 1/1997 | Takekoshi et al. |
| 5,605,979 A | 2/1997 | Priddy, Jr. et al. |
| 5,610,260 A | 3/1997 | Schmalstieg et al. |
| 5,637,655 A | 6/1997 | Priddy, Jr. et al. |
| 5,646,306 A | 7/1997 | Elsasser, Jr. |
| 5,648,454 A | 7/1997 | Brunelle |
| 5,654,395 A | 8/1997 | Jackson, Jr. et al. |
| 5,656,712 A | 8/1997 | Mirossay |
| 5,661,214 A | 8/1997 | Brunelle et al. |
| 5,663,282 A | 9/1997 | Todt et al. |
| 5,668,186 A | 9/1997 | Brunelle et al. |
| 5,693,722 A | 12/1997 | Priddy, Jr. et al. |
| 5,700,888 A | 12/1997 | Hall |
| 5,703,183 A | 12/1997 | Shaffer |
| 5,707,439 A | 1/1998 | Takekoshi et al. |
| 5,710,086 A * | 1/1998 | Brunelle et al. ............. 502/171 |
| 5,736,621 A | 4/1998 | Simon et al. |
| 5,756,644 A | 5/1998 | Hodge et al. |
| 5,760,161 A | 6/1998 | Goins, Jr. et al. |
| 5,786,440 A | 7/1998 | Kohler et al. |
| 5,795,423 A | 8/1998 | Johnson |
| 5,830,541 A | 11/1998 | Carswell et al. |
| 5,849,255 A | 12/1998 | Sawyer et al. |
| 5,849,830 A | 12/1998 | Tsipursky et al. |
| 5,869,586 A | 2/1999 | Riedel et al. |
| 5,936,029 A | 8/1999 | Hall |
| 5,947,392 A | 9/1999 | Molnar et al. |
| 5,952,455 A | 9/1999 | Yanagisawa et al. |
| 5,965,686 A | 10/1999 | Blank et al. |
| 5,968,642 A | 10/1999 | Saito et al. |
| 6,074,978 A | 6/2000 | Shaffer |
| 6,078,135 A | 6/2000 | Lee et al. |
| 6,080,834 A | 6/2000 | Putzig et al. |
| 6,084,019 A | 7/2000 | Matayabas, Jr. et al. |
| 6,093,765 A | 7/2000 | Cottis |
| 6,121,466 A * | 9/2000 | Osterholt et al. ............ 549/267 |
| 6,124,412 A | 9/2000 | Bin-Taleb et al. |
| 6,127,436 A | 10/2000 | Chatterjee et al. |
| 6,147,026 A | 11/2000 | Setiabudi et al. |
| 6,162,857 A | 12/2000 | Trexler, Jr. et al. |
| 6,171,995 B1 | 1/2001 | Muhlebach et al. |
| 6,191,318 B1 | 2/2001 | Park et al. |
| 6,211,316 B1 | 4/2001 | Seebach et al. |
| 6,271,317 B1 | 8/2001 | Halasa et al. |
| 6,284,868 B1 | 9/2001 | Geprags et al. |
| 6,297,330 B1 | 10/2001 | Burch, Jr. et al. |
| 6,353,030 B1 | 3/2002 | Prikoszovich et al. |
| 6,369,157 B1 | 4/2002 | Winckler et al. |
| 6,376,026 B1 * | 4/2002 | Correll et al. ............... 427/512 |
| 6,414,103 B1 | 7/2002 | Correll et al. |
| 6,420,047 B2 | 7/2002 | Winckler et al. |
| 6,420,048 B1 | 7/2002 | Wang |
| 6,432,486 B1 | 8/2002 | Paris et al. |
| 6,436,548 B1 | 8/2002 | Phelps |
| 6,436,549 B1 | 8/2002 | Wang |
| 6,458,972 B1 | 10/2002 | Surburg et al. |
| 6,472,500 B2 | 10/2002 | Dhawan et al. |
| 6,525,164 B2 | 2/2003 | Faler |
| 6,586,558 B2 | 7/2003 | Schmidt et al. |
| 6,639,009 B2 | 10/2003 | Winckler et al. |
| 6,646,134 B2 | 11/2003 | Brugel |
| 6,670,429 B2 | 12/2003 | Appelman et al. |
| 6,713,601 B2 | 3/2004 | Phelps |
| 6,787,632 B2 | 9/2004 | Phelps et al. |

| | | | | | | |
|---|---|---|---|---|---|---|
| 6,806,346 | B2 | 10/2004 | Brugel | GB | 1044205 | 9/1966 |
| 6,831,138 | B2 | 12/2004 | Wang | GB | 1108921 | 4/1968 |
| 6,855,798 | B2 | 2/2005 | Faler | GB | 1273225 | 5/1972 |
| 6,906,147 | B2 | 6/2005 | Wang et al. | GB | 1349324 | 4/1974 |
| 6,960,626 | B2 | 11/2005 | Takekoshi et al. | GB | 2123405 A | 2/1984 |
| 6,962,968 | B2 | 11/2005 | Phelps et al. | JP | 4621873 | 6/1971 |
| 6,994,914 | B2 | 2/2006 | Winckler et al. | JP | 476425 | 10/1972 |
| 7,022,806 | B2 | 4/2006 | Faler | JP | 57122078 A | 7/1982 |
| 7,071,291 | B2 | 7/2006 | Thompson et al. | JP | 6275547 | 4/1987 |
| 7,196,160 | B2 | 3/2007 | Dion et al. | JP | 62141063 A | 6/1987 |
| 7,304,123 | B2 | 12/2007 | Thompson et al. | JP | 63156824 A | 11/1988 |
| 7,329,703 | B2 | 2/2008 | Dion et al. | JP | 02147657 A | 6/1990 |
| 2002/0137834 | A1 | 9/2002 | Barbee et al. | JP | 02298512 | 12/1990 |
| 2004/0155380 | A1 | 8/2004 | Kendall et al. | JP | 4253764 | 9/1992 |
| 2004/0188883 | A1 | 9/2004 | Barron et al. | JP | 08-093594 | 4/1996 |
| 2005/0288176 | A1 | 12/2005 | Kuhlman et al. | JP | 09048876 | 2/1997 |
| 2005/0288420 | A1 | 12/2005 | Paquette et al. | JP | 09-110832 | 4/1997 |
| 2006/0003887 | A1 | 1/2006 | Paquette et al. | JP | 09-238806 | 9/1997 |
| 2006/0004135 | A1 | 1/2006 | Paquette et al. | JP | 10-069915 | 3/1998 |

FOREIGN PATENT DOCUMENTS

| | | |
|---|---|---|
| CH | 654304 A5 | 2/1986 |
| CN | 1120555 | 4/1996 |
| DE | 3607627 | 9/1987 |
| DE | 4034574 A1 | 5/1992 |
| EP | 0000544 B1 | 8/1982 |
| EP | 0153785 A2 | 9/1985 |
| EP | 0 172 636 | 2/1986 |
| EP | 0216496 A2 | 4/1987 |
| EP | 0 273 148 | 7/1988 |
| EP | 0153785 B1 | 7/1989 |
| EP | 0419254 A2 | 3/1991 |
| EP | 0486832 A2 | 5/1992 |
| EP | 0264835 B1 | 6/1992 |
| EP | 0235741 B1 | 1/1993 |
| EP | 0543492 A1 | 5/1993 |
| EP | 0 566 313 A2 | 10/1993 |
| EP | 0589640 A1 | 3/1994 |
| EP | 0598604 A1 | 5/1994 |
| EP | 0601753 A1 | 6/1994 |
| EP | 0635512 A1 | 1/1995 |
| EP | 0655476 A1 | 5/1995 |
| EP | 0436186 B1 | 10/1995 |
| EP | 0688778 A1 | 12/1995 |
| EP | 0714926 A2 | 6/1996 |
| EP | 0699701 A3 | 9/1996 |
| EP | 0798336 A2 | 10/1997 |
| EP | 1 008 629 | 6/2000 |
| EP | 1 026 203 | 8/2000 |
| EP | 1 111 012 A9 | 6/2001 |
| EP | 1 172 409 | 1/2002 |
| EP | 01942649.3-2102 | 10/2002 |
| EP | 0 594 385 | 5/2003 |
| EP | 1 308 208 | 5/2003 |
| EP | 0594385 | 5/2003 |
| EP | 01968413.3-2102 | 5/2003 |
| EP | 01968581.7-2101 | 6/2003 |
| EP | 1 354 908 | 10/2003 |
| EP | 1 378 540 | 1/2004 |
| EP | 02756358.4-2117 | 4/2004 |
| EP | 1 420 036 | 5/2004 |
| EP | 1 475 402 | 11/2004 |
| EP | 02734665.9-2102 | 12/2004 |
| EP | 03714278.3-2102 | 12/2004 |
| EP | 1 522 395 A2 | 4/2005 |
| EP | 1 409 475 B1 | 10/2005 |
| EP | 1 604 987 A3 | 5/2008 |
| FR | 2 530 628 | 1/1984 |
| GB | 765 597 | 1/1957 |
| GB | 798412 | 7/1958 |
| GB | 957841 | 5/1964 |
| GB | 991020 | 5/1965 |
| JP | 10-194262 | 7/1998 |
| JP | 11-136942 | 5/1999 |
| JP | 2001031846 | 2/2001 |
| JP | 2002293902 | 10/2002 |
| JP | 2002293903 | 10/2002 |
| JP | 2002308969 | 10/2002 |
| JP | 2002317041 | 10/2002 |
| JP | 02320499 | 11/2002 |
| JP | 02322272 | 11/2002 |
| JP | 02338672 | 11/2002 |
| JP | 2003082081 | 3/2003 |
| SU | 1077893 | 3/1984 |
| SU | 1532560 A1 | 12/1989 |
| WO | WO-88/06605 | 9/1988 |
| WO | WO-91/09899 | 7/1991 |
| WO | WO-93/04106 | 3/1993 |
| WO | WO-95/00574 | 1/1995 |
| WO | WO-95/30702 | 11/1995 |
| WO | WO-96/22319 | 7/1996 |
| WO | WO-99/25485 | 5/1999 |
| WO | WO-00/27632 | 5/2000 |
| WO | WO-00/38897 | 7/2000 |
| WO | WO-01/53379 | 7/2001 |
| WO | WO-01/56694 | 8/2001 |
| WO | WO-02/18476 | 3/2002 |
| WO | WO-02/22738 | 3/2002 |
| WO | WO-02/051616 A | 7/2002 |
| WO | WO-02/098946 | 12/2002 |
| WO | WO-02/098947 | 12/2002 |
| WO | WO-03/002551 | 1/2003 |
| WO | WO-03/031059 | 4/2003 |
| WO | WO-03/031496 | 4/2003 |
| WO | WO-03/080705 | 10/2003 |
| WO | WO-2004/058471 | 7/2004 |
| WO | WO-2004/058854 | 7/2004 |
| WO | WO-2004/058868 | 7/2004 |
| WO | WO-2004/058872 | 7/2004 |
| WO | WO-2004/060640 | 7/2004 |
| WO | WO-2005/063882 | 7/2005 |
| WO | WO-2005/090508 | 9/2005 |
| WO | WO-2005/105889 | 11/2005 |
| WO | WO-2005/121233 | 12/2005 |
| WO | WO-2006/009735 | 1/2006 |
| WO | WO-2006/009803 | 1/2006 |
| WO | WO-2006/009804 | 1/2006 |
| WO | WO-2006/028541 | 3/2006 |

OTHER PUBLICATIONS

Bagshaw et al., "Templating of Mesoporous Molecular Sieves by Nonionic Polyethylene Oxide Surfactants," Science, 269, p. 1242, Sep. 1, 1995.

Beach, A. Christopher G. "The Preparation of Mirrors by Sputtering Metals onto Glass Surfaces," A. Inst. P., Chelsea Polytechnic, M.S.

Brunelle (1995) "*Macrocycles For The Synthesis of High Molecular Weight Polymers*," pp. 197-235, ch. 6, New Methods of Polymer Synthesis: vol. 2, edited by J.R. Ebdon and G.C. Eastmond.

Brunelle et al. (1997) "*Semi-crystalline Polymers via Ring-Opening Polymerization: Preparation and Polymerization of Alkylene Phthalate Cyclic Oligomers*," Polymers Preprints vol. 38, No. 2, pp. 381-382.

Brunelle et al. (1998) "*Semicrystalline Polymers via Ring-Opening Polymerization: Preparation and Polymerization of Alkylene Phthalate Cyclic Oligomers*," Macromolecules vol. 31, No. 15, 4782-4790.

Burch, R. R. et al. (2000) "*Synthesis of Cyclic Oligoesters and Their Rapid Polymerization to High Molecular Weight*," Macromolecules, vol. 33, No. 14, 5053-5064.

Chisholm et al. "*Syntheses and structural characterization of 2,2'-methylene-bis(6-t-butyl-4-methyl-phenoxide) complexes of titanium, zirconium and tantalum*," Polyhedron, vol. 16, No. 17, (1997) pp. 2941-2949.

Cotton, N. J. et al. (1993) "*Rate and Extent of Supercritical Fluid Extraction of Cyclic Trimer from Poly(Ethylene Terephthalate) at Elevated Temperatures*," Journal of Chromatographic Science, vol. 31, No. 5, 157-161.

Cussler et al. "*Barrier Membranes*," Journal of Membrane Science, 38 (1988) pp. 161-174.

Durfee et al. "*Chemical and Electrochemical Reduction of Titanium (IV) Aryloxides*," Inorganic Chemistry, 24 (1985) pp. 4569-4573.

Fantacci et al. "*Density Functional Study of Tetraphenolate and Calix[4]arene Complexes of Early Transition Metals*," Inorganic Chemistry, 40 (2001) pp. 1544-1549.

Fukushima et al. "*Graphite Nanoplatelets as Reinforcements for Polymers: Structural, Electrical and Thermal Properties*," Proc. 2nd Ann., Automotive Comp. Conf., Soc. Plast. Eng., Sep. 2002, 7 pgs.

Fukushima et al. "*Synthesis of an Intercalated Compound of Montmorillonite and 6-Polyamide*," Journal of Inclusion Phenomena, 5 (1987) pp. 473-482.

Hall et al. "*Recent research on the synthesis and applications of cyclic oligomers*," Reactive & Functional Polymers, 41 (1999), pp. 133-139.

Hamb et al. "*Synthesis of Cyclic Tris(Ethylene Terephthalate)*," Polymer Letters, 5 (1967), pp. 1057-1058.

Hamilton et al. (1998) "*Cyclic Polyesters: Part 8. Preparation and Characterization of Cyclic Oligomers in Six Aromatic Ester and Ether-Ester Systems*," Polymer vol. 39, No. 14., 3241-3252.

Harrison, A. G. et al. (1997) "*Analysis of cyclic oligomers of poly(ethylene terephthalate) by liquid chromatography/mass spectrometry*," Polymer Communications, vol. 38, No. 10, 2549-2555.

Henshaw et al. (1994) "*Recycling of a Cyclic Thermoplastic Composite Material by Injection and Compression Molding*," J. of Thermoplastic Composite Materials vol. 7 (1), 14-29.

Hubbard, P. A. (1996) "*Polyesters via Macrocyclic Oligomers*," Dissertation presented at the University of Akron.

Kaviratna et al., "*Synthesis of Polyether-Clay Nanocomposites: Kinetics of Epoxide Self-Polymerization in Acidic Smectite Clays*," Polym. Prep., 31(1), 788 (1994).

Kojima et al., "*Mechanical properties of nylon 6-clay hybrid*," J. Mater. Res., 8, 1185 (1993).

Kricheldorf, H. R. et al. (1997) "*Macrocycles IV. Macrocyclic Polylactones as Bifunctional Monomers for Polycondensations*," Journal of Polymer Science, vol. 36, No. 9, 1373-1378.

Kricheldorf, H. R. et al. (1998) "*Macrocycles. 3. Telechelic Polylactones via Macrocyclic Polymerization*," Macromolecules, vol. 31, No. 3, 614-620.

Lattimer et al. (1998) "*MALDI-MS Analysis of Pyrolysis Products From a Segmented Polyurethane*," Journal of Analytical and Applied Pyrolysis, vol. 48, 1-15.

Lee, J. et al., "*Fire Retardent Polyetherimide Nanocomposites*," Matter Res. Soc. Proc., 457, 513-518, (1997).

Lee, S.-S. et al., "*Synthesis of PET-Layered Silicate Nanocomposites Using Cyclic Ester Oligomers*," Polymeric Materials: Science and Engineering, 89, 370-1 (2003).

Lui et al. (1999) "*Preparation of Cyclic Polyester Oligomers and Ultra-Low VOC Polyester Coatings*," Polymer Reprints, vol. 40, No. 1, pp. 137-138.

Martin et al. (1987) "*Pultrusion*," Engineered Materials Handbook: vol. 1 Composites, pp. 533-543.

Messersmith et al., "*Polymer-Layered Silicate Nanocomposites: In Situ Intercalative Polymerization of $\epsilon$-Caprolactone in Layered Silicates*," Chem. Mater., 5, 1064 (1993).

Miller, S. (1998) "*Macrocyclic polymers from cyclic oligomers of poly(butylene terephthalate)*," Dissertation Presented at University of Massachusetts, Amherst, MA US.

Mueller, F. J. et al. (1983) "*Synthesis of Cyclic Oligomers of Butylene Terephthalate*," Makromol. Chem., vol. 184, No. 12, 2487-95.

Mueller, F. J. et al. (1983) "*Synthesis of Cyclic Oligomers of Butylene Terephthalate*," Makromol. Chem., vol. 184, No. 12, 2487-95. (Translation).

Nazar, et al., "*Synthesis and Properties of a New (PEO)x[Na(H2O)]0.25MoO3 Nanocomposites*," J. Mater. Res., 5(11), 1985 (1995).

Okada, et al., "*Synthesis and Characterization of a Nylon 6-Clay Hybrid*," Polym. Prep., 28, 447, (1987).

Okuda et al. "*Synthesis and Characterization of Mononuclear Titanium Complexes Containing a Bis(phenoxy) Ligand Derived from 2,2'-Methylene-bis(6-tert-butyl-4-methylphenol)*," Chem. Ber., vol. 128, (1995) pp. 221-227.

Oriakhi et al., "*Poly(Pyrrole) and Poly(Thiophene) / Clay Nanocomposites Via Latex-Colloid Interaction*," Mater. Res. Bull., 30, No. 6, p. 723, (1995).

Perovic et al. (1982) "*Crystallization of Cyclic Oligomers in Commercial Poly(ethleneterephthalate) Films*," Polymer Bulletin vol. 6, 277-283.

Perovic, A. (1985) "*Morphological Instability of poly(ethylene terephthalate) cyclic oligomer crystals*," Journal of Material Science, vol. 20, Iss. 4, 1370-1374.

Roelens, S. (1988) "*Organotin-Mediated Synthesis of Macrocyclic Polyesters: Mechanism and Selectivity in the Reaction of Dioxastannolanes with Diacyl Dichlorides*," Journal of the Chemical Society, Perkin Transactions 2, vol. 8, 1617-1625.

Ruddick et al. "*A new method for the polymer-supported synthesis of cyclic oligoesters for potential applications in macrocyclic lactone synthesis and combinatorial chemistry*," J. Chem. Soc., Perkin Trans. 1, 2002, pp. 627-637.

Scatteia et al., "*Rheology of PBT-Layered Silicate Nanocomposites Prepared by Melt Compounding*," Plastics, Rubbers and Composites, 33, 85-91 (2004) and references therein.

Spanagel et al. "*Macrocyclic Esters*," Contribution No. 153 from The Experimental Station of E.I. duPont deNemours &Company, vol. 57, pp. 929-934.

Toth et al. "*Towards supported catalyst models: the synthesis, characterization, redox chemistry, and structures of the complexes $Ti(Oar')_4$ ($Ar' = C_6H_4(2-t-Bu)$, $C_6H(2,3,5,6-Me)_4$)*," Canadian Journal of Chemistry, vol. 69, (1991) pp. 172-178.

Tripathy, et al., "*Poly(Butylene Terephthalate) Nanocomposites Prepared by In-Situ Polymerization*," Macromolecules, 36, 8593-5 (2003).

Uhi et al. "*Flame Retarduncy of Graphite Nanocomposites*," Polym. Mater. Sci. Eng. 83:56(2000).

Usuki et al. "*Swelling behavior of montmorillonite cation exchanged for $\omega$-amino acids by $\epsilon$-caprolactam*," J. Mater. Res., vol. 8, No. 5, May 1993, pp. 1174-1178.

Usuki et al. "*Synthesis of nylon 6-clay hybrid*," J. Mater. Res., vol. 8, No. 5, May 1993, pp. 1179-1184.

Vankelecom et al. "*Incorporation of Zeolites in polyimide Membranes*," J. Phys. Chem., 99, 13187 (1995).

Ward et al. "*Gas barrier improvement using vermiculite and mica in polymer films*," Journal of Membrane Science, 55 (1991) pp. 173-180.

Xiao et al. "*Preparation of exfoliated graphite/polystyrene composite by polymerization-filling technique*," Polymer, 42 (2001) pp. 4813-4816.

Yano, K. et al., "*Synthesis and Properties of Polyimide-Clay Hybrid*," J. Polym. Sci., Part A, Polym. Chem., 31, 2493 (1993).

Youk et al. "*Polymerization of Ethylene Terephthalate Cyclic Oligomers with Antimony Trioxide*," Macromolecules, 33 (2000), pp. 3594-3599.

Related European Patent Application No. 05015518.3—Examination report issued Jul. 26, 2006; Reply filed Nov. 24, 2006; Examination report issued Dec. 28, 2006.
European Search Report for EP 05 01 5518.3 dated Oct. 19, 2005.
Communication pursuant to Article 96(2) EPC for 03714278.3-2102, dated Nov. 25, 2004.
Communication pursuant to Article 96(2) EPC for 01968413.3-2102, dated Dec. 3, 2004.
Communication pursuant to Article 96(2) EPC for 01942649.3-2102, dated Jan. 9, 2004.
Communication pursuant to Article 96(2) EPC for 01968581.7-2102, dated Nov. 11, 2003.
Communication pursuant to Article 96(2) EPC for 02734665.9-2102, dated Dec. 3, 2004.
Communication pursuant to Article 96(2) EPC for 02756358.4-2117, dated May 6, 2004.
Communication pursuant to Article 51(4) EPC for 02756358.4-2117, dated Feb. 4, 2005.
EPO Online Public File Inspection, European Patent Application No. EP20020756358.
First Examination Report (with Annex), Europoean Patent Application No. EP20020756358.
Reply to First Examination Report, European Patent Application No. EP20020756358.
Declaration to Grant a European patent pursuant to article 997(2) EPC, European Patent Application No. EP20020756358.
International Search Report and Written Opinion of the International Searching Authority for PCT/US2007/007982, mailed Oct. 2, 2007 (9 pages).
International Search Report for PCT/US2002/20882, mailed Oct. 1, 2002 (3 pages).
International Preliminary Examination Report and Written Opinion of the International Searching Authority for PCT/US2002/20882 (10 pages).

* cited by examiner

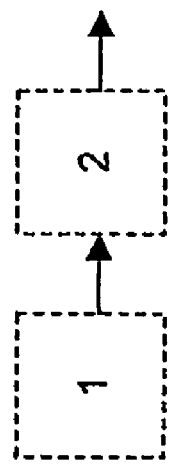
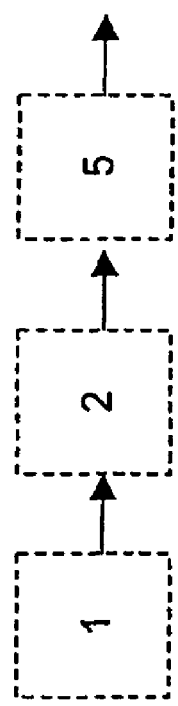
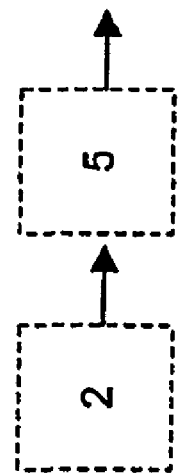
FIG. 8
FIG. 9
FIG. 10

ISOLATION, FORMULATION, AND SHAPING OF MACROCYCLIC OLIGOESTERS

RELATED APPLICATIONS

This application is a divisional of U.S. patent application Ser. No. 10/485,921, filed on Feb. 5, 2004, which is a National stage of International Patent Application No. PCT/US02/20882, filed on Jun. 26, 2002, which claims the benefit of the filing date of U.S. Provisional Application Ser. No. 60/301,399, filed on Jun. 27, 2001, each of which is incorporated by reference herein in its entirety.

TECHNICAL FIELD

The invention relates generally to thermoplastics and articles formed therefrom. More particularly, the invention relates to processes for isolating, formulating, and shaping macrocyclic oligoesters such as macrocyclic oligoesters of 1,4-butylene terephthalate.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss, and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding.

Recently, macrocyclic oligoesters were developed that have unique properties that make them attractive for a variety of applications, including as matrices for engineering thermoplastic composites. Macrocyclic oligoesters exhibit low melt viscosity, for example, allowing them easily to impregnate a dense fibrous preform followed by polymerization to polymers. Furthermore, certain macrocyclic oligoesters melt and polymerize at temperatures well below the melting point of the resulting polymer. Upon melting and in the presence of an appropriate catalyst, polymerization and crystallization can occur virtually isothermally.

Production of macrocyclic oligoesters such as macrocyclic (1,4-butylene terephthalate) typically involves the use of one or more solvents such as o-dichlorobenzene or xylene. Some prior techniques that have been used to recover macrocyclic oligoesters dissolved in a solvent required the addition of a large amount of anti-solvent to the solution to precipitate the macrocyclic oligoester followed by collection of the product using a filter or a centrifuge. The use of anti-solvents results in increased processing complexity, costs, and creates additional environmental storage and disposal concerns.

Linear polyesters may be depolymerized to form macrocyclic oligoesters. The product solution of a depolymerization reaction may be dilute, making recovery more time consuming. Depolymerization production efforts also generally take place in stages, with each stage including a step of the process and with intermediate storage between the steps.

SUMMARY OF THE INVENTION

There is a need for effective, efficient, and low cost processes for isolating, formulating, and shaping macrocyclic oligoesters. There is also a need for processes that enable continuous production of macrocyclic oligoesters. In one aspect, the invention generally relates to processes for producing macrocyclic oligoesters (e.g., macrocyclic 1,4-butylene terephthalate oligomers), including processes for isolating macrocyclic oligoesters from solvents so the resulting macrocyclic oligoesters are substantially free from solvent. The invention also includes processes for formulating and shaping the substantially solvent free macrocyclic oligoesters. In some embodiments, the described processes are performed continuously, to enable continuous production in a manufacturing plant. Further, the described processes can be beneficially combined for greater efficiencies and production benefits.

In one aspect, the invention features a process for isolating a macrocyclic oligoester. A solution including a macrocyclic oligoester and a solvent is provided. The macrocyclic oligoester typically has a structural repeat unit of formula (I):

where R may be an alkylene, a cycloalkylene, or a mono- or polyoxyalkylene group, and A may be a divalent aromatic or alicyclic group. The solvent is then removed without the use of anti-solvent. In typical practice, substantially all of the solvent is removed. In one embodiment, the solvent is removed under elevated temperature conditions. In another embodiment, the solvent is removed under reduced pressure conditions. In another embodiment, the solvent is removed under a combination of both elevated temperature and reduced pressure conditions. The macrocyclic oligoester, which is substantially free from the solvent then typically is collected. In one embodiment, the solvent is continuously removed from the solution. In another embodiment, the macrocyclic oligoester substantially free from the solvent is continuously collected.

In another aspect, the invention features a process for shaping a partially-crystallized macrocyclic oligoester. In one embodiment, this process includes providing a substantially solvent-free molten macrocyclic oligoester typically having the structural repeat unit of the formula (I) described above. The substantially solvent-free molten macrocyclic oligoester is sheared to form a partially-crystallized macrocyclic oligoester. The partially-crystallized macrocyclic oligoester is then shaped. In one embodiment, a continuous flow of substantially solvent-free molten macrocyclic oligoester is sheared continuously. In another embodiment, the step of shaping the partially-crystallized macrocyclic oligoester is conducted continuously.

In yet another aspect, the invention features a process for making a prepreg of a macrocyclic oligoester and a polymerization catalyst. In one embodiment, a mixture of a molten macrocyclic oligoester and a polymerization catalyst, which is substantially free from any solvent, is provided. The macrocyclic oligoester typically has the structural repeat unit of the formula (I) described above. The mixture is deposited onto a fabric material, forming a prepreg. In one embodiment, the mixture is partially-crystallized prior to being deposited onto the fabric material.

In yet another aspect, the invention features a process for making a prepreg of a macrocyclic oligoester and a polymerization catalyst. In one embodiment, a mixture of a molten macrocyclic oligoester and a polymerization catalyst, which is substantially free from any solvent, is provided continuously. The macrocyclic oligoester typically has the structural repeat unit of formula (I) described above. The mixture of the macrocyclic oligoester and the polymerization catalyst is crystallized partially and deposited onto a fabric material.

In still another aspect, the invention features a process for formulating a macrocyclic oligoester. In one embodiment, a solution including a macrocyclic oligoester and a solvent is provided. The macrocyclic oligoester typically has a structural repeat unit of formula (I) described above. The solvent often is continuously removed from the solution at a temperature between about 180° C. and about 200° C. and at a pressure between about atmospheric pressure and about 10 torr. The step of solvent removal produces a substantially solvent-free molten macrocyclic oligoester. The substantially solvent-free molten macrocyclic oligoester then is sheared at a temperature below the melting point of the molten macrocyclic oligoester. In one embodiment, the shearing temperature is maintained between about 145° C. and about 155° C., thereby forming a partially-crystallized macrocyclic oligoester. The partially-crystallized macrocyclic oligoester is shaped into one or more shapes such as a pellet, a pastille, and/or a flake.

BRIEF DESCRIPTION OF FIGURES

FIG. 8 is a schematic flow diagram of an embodiment of a solvent removal system.

FIG. 9 is a schematic flow diagram of an embodiment of a system for shaping macrocyclic oligoesters from a solution of macrocyclic oligoester and solvent.

FIG. 10 is a schematic flow diagram of an embodiment of a system for shaping macrocyclic oligoesters from a solution of macrocyclic oligoester and solvent.

DESCRIPTION

Figure 1:
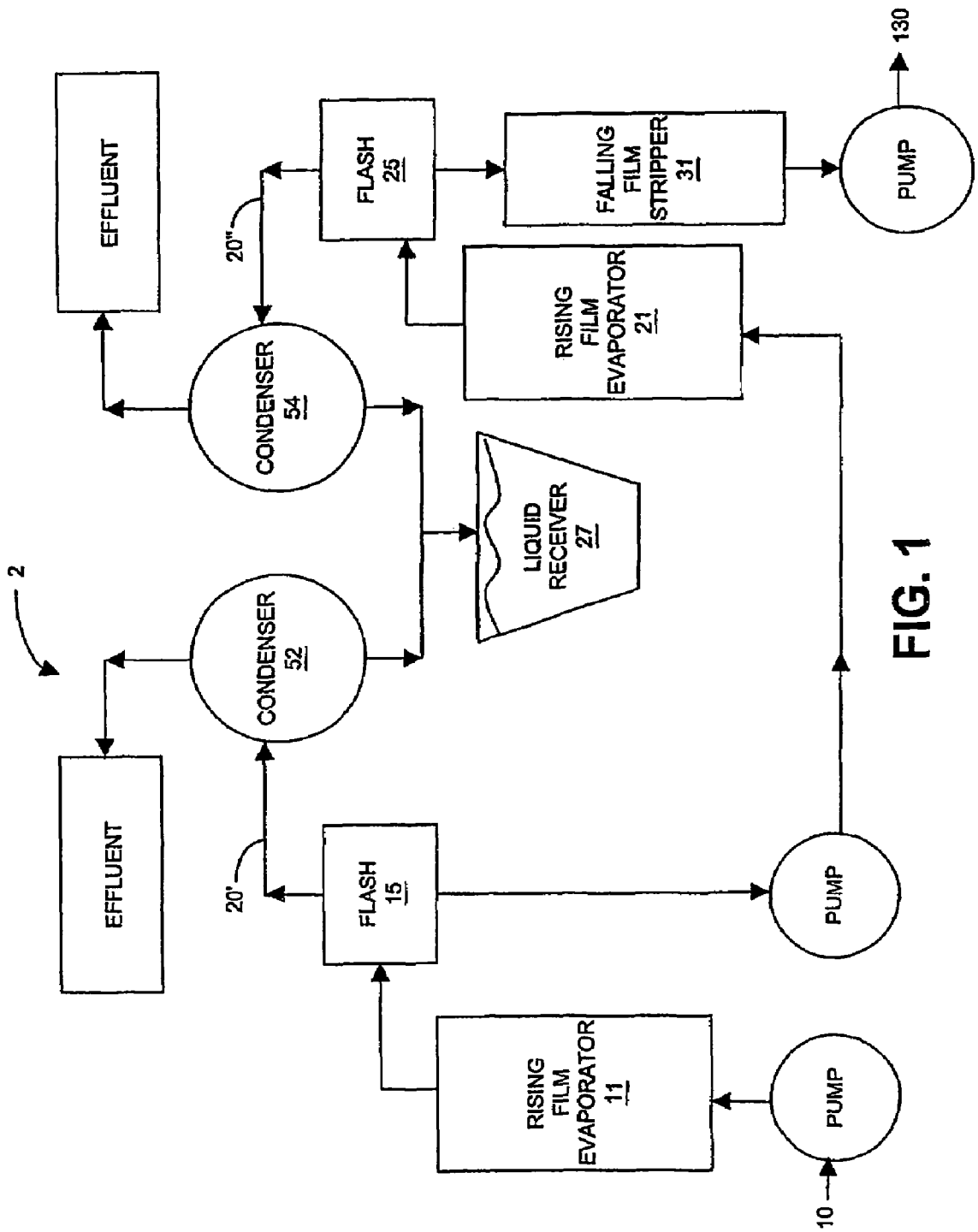
FIG. 1 is a schematic flow diagram of an embodiment of a solvent removal system.

The processes of the invention are more efficient and economical than existing techniques because the isolation, formulation, and shaping processes may be carried out continuously and on a large scale. The purity of the macrocyclic oligoester may be effectively controlled by the incorporation of multiple solvent removal apparatus where necessary. The isolation, formulation, and shaping processes also may be beneficially linked, resulting in efficient mass production and lowered manufacturing costs. Such linked processes avoid product and energy waste incurred when the isolation, formulation, and shaping processes are conducted separately. For example, macrocyclic oligoesters may be isolated in a molten state. The shaping process typically requires the macrocyclic oligoesters to be provided in a molten state. Accordingly, linking these processes reduces energy uses and increases production efficiency.

For example of the benefits of continuous production, a macrocyclic oligoester having between about 80 ppm and about 400 ppm solvent may be produced at a rate of between about 40 kg/hr and about 300 kg/hr using a feed solution having 20% by weight of macrocyclic oligoester, which can be fed at a rate of between about 200 kg/hr and about 1,500 kg/hr. For example, after solvent removal, the macrocyclic oligoester, which is substantially free from solvent, may be collected at a rate of between about 80 kg/hr to about 250 kg/hr. Pellets and pastilles of formulated and shaped macrocyclic oligoesters also can be produced at a similar rate.

Definitions

The following general definitions may be helpful in understanding the various terms and expressions used in this specification.

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, an "oligoester" means a molecule that contains 2 or more identifiable ester functional repeat units of the same or different formula.

As used herein, a "macrocyclic oligoester" means a macrocyclic oligomer containing 2 or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or a higher order oligoester, i.e., an oligoester having two or more different structural repeat units having an ester functionality within one cyclic molecule.

As used herein, "an alkylene group" means —$C_nH_{2n}$—, where $n \geq 2$.

As used herein, "a cycloalkylene group" means a cyclic alkylene group, —$C_nH_{2n-x}$—, where x represents the number of H's replaced by cyclization(s).

As used herein, "a mono- or polyoxyalkylene group" means [—$(CH_2)_m$—O—]$_n$—$(CH_2)_m$—, wherein m is an integer greater than 1 and n is an integer greater than 0.

As used herein, "a divalent aromatic group" means an aromatic group with links to other parts of the macrocyclic molecule. For example, a divalent aromatic group may include a meta- or para-linked monocyclic aromatic group (e.g., benzene).

As used herein, "an alicyclic group" means a non-aromatic hydrocarbon group containing a cyclic structure therein.

As used herein, "partially-crystallized macrocyclic oligomer" means a macrocyclic oligomer at least a portion of which is in crystalline form. Partially-crystallized macrocyclic oligomer may have various degrees of crystallinity ranging from 1% crystalline to 99% crystalline. Crystallinity imparts handleablility to the macrocyclic oligomer, enabling it to be shaped, for example.

As used herein, "a continuous process" means a process that operates on the basis of a continuous flow of materials into and/or materials out of the process.

As used herein, "a polyester polymer composite" means a polyester polymer that is associated with another substrate such as a fibrous or particulate material. Illustrative examples of particulate material are chopped fibers, glass microspheres, and crushed stone. Certain fillers and additives thus can be used to prepare polyester polymer composites. A fibrous material means more substrate, e.g., fiberglass, ceramic fibers, carbon fibers or organic polymers such as aramid fibers.

As used herein, "a fabric material" means any substrate useful in receiving macrocyclic oligoesters during production and formulation processes and in preparing prepregs of macrocyclic oligomers. Typically, fabric materials include fiber tow, fiber web, fiber mat, and fiber felt. The fabric materials may be woven or non-woven, unidirectional, or random.

Macrocyclic Oligoesters

Macrocyclic oligoesters that may be processed according to processes of this invention include, but are not limited to, macrocyclic poly(alkylene dicarboxylate) oligomers typically having a structural repeat unit of the formula:

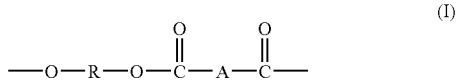
(I)

wherein R is an alkylene, a cycloalkylene, or a mono- or polyoxyalkylene group; and A is a divalent aromatic or alicyclic group.

Preferred macrocyclic oligoesters are macrocyclic oligoesters of 1,4-butylene terephthalate, 1,3-propylene terephthalate, 1,4-cyclohexylenedimethylene terephthalate, ethylene terephthalate, propylene terephthalate, and 1,2-ethylene 2,6-naphthalenedicarboxylate, and macrocyclic co-oligoesters comprising two or more of the above structural repeat units.

Synthesis of the macrocyclic oligoesters may be achieved by contacting at least one diol of the formula HO—R—OH with at least one diacid chloride of the formula:

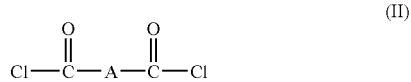
(II)

where R and A are as defined above. The reaction typically is conducted in the presence of at least one amine that has substantially no steric hindrance around the basic nitrogen atom. An illustrative example of such amines is 1,4diazabicyclo[2.2.2]octane (DABCO). The reaction usually is conducted under substantially anhydrous conditions in a substantially water immiscible organic solvent such as methylene chloride. The temperature of the reaction typically is within the range of from about −25° C. to about 25° C. See e.g., U.S. Pat. No. 5,039,783 to Brunelle et al.

Macrocyclic oligoesters also can be prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine. The condensation reaction is conducted in a substantially inert organic solvent such as methylene chloride, chlorobenzene, or a mixture thereof. See e.g., U.S. Pat. No. 5,231,161 to Brunelle et al.

Another method for preparing macrocyclic oligoesters or mracrocyclic co-oligoesters is the depolymerization of linear polyester polymers in the presence of an organotin or titanate compound. In this method, linear polyesters are converted to macrocyclic oligoesters by heating a mixture of linear polyesters, an organic solvent, and a transesterification catalyst such as a tin or titanium compound. The solvents used, such as o-xylene and o-dichlorobenzene, usually are substantially free from oxygen and water. See e.g., U.S. Pat. No. 5,407,984 to Brunelle et al. and U.S. Pat. No. 5,668,186 to Brunelle et al.

It is also within the scope of the invention to process macrocyclic co- and higher order oligoesters using the methods of the invention. Therefore, unless otherwise stated, an embodiment of a composition, article, or process that refers to macrocyclic oligoesters also includes embodiments utilizing macrocyclic co-oligoesters and higher order oligoesters.

Isolation of Macrocyclic Oligoesters

In one aspect, the invention generally features processes for isolating a macrocyclic oligoester from a solution having a macrocyclic oligoester and a solvent in a manner that does not require use of an anti-solvent. In one embodiment, the process includes removing solvent to yield a macrocyclic oligoester substantially free from solvent. A solution including a macrocyclic oligoester and a solvent is provided. The solvent is then removed without the use of anti-solvent. In one embodiment, the solvent is removed under reduced temperature conditions. In another embodiment, the solvent is removed under elevated pressure conditions. In another embodiment, the solvent is removed under a combination of both elevated temperature and reduced pressure conditions. The macrocyclic oligoester substantially free from the solvent then typically is collected. In one embodiment, the solvent is continuously removed from the solution including a macrocyclic oligoester and a solvent. In another embodiment, the macrocyclic oligoester substantially free from the solvent is continuously collected.

There is no limitation to the concentration of macrocyclic oligoester in the solution. In one embodiment, the solution of a macrocyclic oligoester and a solvent (the input or feed solution) contains between about 1% and about 50% by weight macrocyclic oligoester. In other embodiments, the feed solution contains between about 3% and about 50%, between about 5% and about 40%, between about 5% and about 20%, between about 3% and about 10%, or between about 1% to about 3% by weight macrocyclic oligoester. The solution may contain one or two or more different solvents. "Solvent" used herein refers to the solvent or solvents contained in the feed solution.

Solvent removal may be carried out at an elevated temperature, at a reduced pressure, or both. In one embodiment, the feed solution is heated at an elevated temperature and a reduced pressure to remove the solvent from the solution. The resulting macrocyclic oligoester is substantially free from solvent. A macrocyclic oligoester is substantially free from solvent if the solvent content is less than 200 ppm. Preferably, the solvent content is less than 100 ppm. More preferably the solvent content is less than 50 ppm or less than 10 ppm.

The processing temperature and pressure for solvent removal are selected according to factors including the solvent to be removed, the solvent removal device(s) used, the desired time of purification, and the macrocyclic oligoester being isolated. In one embodiment, the step of removing solvent is conducted at a temperature within a range from ambient temperature to about 300° C. In other embodiments, the step of removing solvent is conducted from about 200° C. to about 260° C., from about 230° C. to about 240° C., or from about 180° C. to about 200° C.

The pressure at which solvent removal is conducted can vary from atmospheric pressure to about 0.001 torr. In one embodiment, the pressure is within a range from 0.001 torr to about 0.01 torr. In other embodiments, the pressure is within a range from atmospheric pressure to about 10 torr, from about 10 torr to about 5.0 torr, from about 5.0 torr to about 1.0 torr, from about 1.0 torr to about 0.1 torr, or from about 0.1 torr to about 0.01 torr.

Solvent removal may be accomplished in almost any apparatus, e.g., vessels or devices or a combination of apparatus. Non-limiting examples of solvent removal apparatus that may be employed include a rising film evaporator, a falling film stripper, a thin film evaporator, a wiped film evaporator, a molecular still, a short path evaporator, a centrifuge, and a filter. The terms evaporator and stripper may be used interchangeably. In one embodiment, the rising film evaporator may be a tubular heat exchanger. A rising film evaporator is an apparatus used to vaporize part or all of the solvent from a solution-where the solution is introduced to the bottom of the evaporator. A falling film stripper is an evaporative device for the removal of vapors from solution, where the solution is introduced to the top of the apparatus and travels to the bottom of the apparatus. A thin film evaporator is an apparatus that generates and exposes a thin film of material for evaporation and has the vapor condenser outside of the evaporator. A wiped film evaporator is an apparatus that generates and exposes a thin film of material to wiping or agitation to provide evaporation. A short path evaporator generates and exposes a thin film of material for evaporation and has the vapor condenser inside the evaporator. In some embodiments, the short path evaporator exposes the thin film to wiping or agitation to provide evaporation. A molecular still is an apparatus that utilizes a condenser inside the body of the still. One or more solvent removal device may be employed in accordance with the invention. In one embodiment, each solvent removal apparatus used in the process removes between about 80% and about 90% of the solvent. In one embodiment, multiple solvent removal apparatus are employed to achieve the desired dryness in the macrocyclic oligoester substantially free from solvent.

FIG. 1 schematically illustrates one embodiment of a solvent removal system 2. An input solution 10 is pumped into a rising film evaporator 11. As the input solution travels up the first rising film evaporator 11, some of the solvent vaporizes and is separated from the solution. This solution and the vapor then travels through a flash device 15. A flash device is an apparatus that is used to separate the liquid and the gas phase. The liquid phase solution then is pumped into a second rising film evaporator 21. After traveling through another flash device 25, the vapor phase solvent that is removed from flash devices 15 and 25 is pumped through paths 20' and 20", respectively, and is condensed in condensers 52 and 54. The condensers 52 and 54 change any vapor phase solvent in paths 20' and 20" into a liquid phase. Optionally, effluent containing removed solvent may be discharged from condensers 52 and 54. The condensed solvent is then collected in the liquid receiver 27. The solution containing macrocyclic oligoester is pumped from flash device 25 into a falling film stripper 31. In one embodiment, the vapors removed in the falling film stripper 31 also travel through the flash device 25. An output product 130, which is substantially free from solvent, is pumped out of the falling film stripper 31. In one embodiment, the output product 130 is molten.

Substantially all of the solvent in the input solution can be removed from the macrocyclic oligoester to form a macrocyclic oligoester substantially free from solvent. In one embodiment, the macrocyclic oligoester substantially free from solvent may contain about 200 ppm or less of solvent In other embodiments, the macrocyclic oligoester substantially free from solvent may contain about 100 ppm or less of solvent, about 50 ppm or less of solvent, and about 10 ppm or less of solvent. The amount of solvent remaining in the macrocyclic oligoester substantially free from solvent may be measured using chromatographic techniques such as gas chromatography, GCMS, or HPLC.

In determining an appropriate solvent stripping system to employ in a particular process, factors that need to be considered include the concentration of macrocyclic oligoester in the feed solution, the desired dryness and/or purity of the product, the solvent to be removed, and the desired length of time for solvent removal. For example, starting with a relatively dilute feed solution (i.e., low percentage of macrocyclic oligoester), more solvent removal steps and/or time may be necessary to produce a substantially solvent free macrocyclic oligoester. Conversely, a concentrated feed solution of macrocyclic oligoester may require fewer solvent removal steps and/or time.

Generally and in one embodiment, solvent is removed from an input solution by exposing the input solution to an elevated temperature and a reduced pressure in a first rising film evaporator. The input solution then travels to a second rising film evaporator where it is exposed to an elevated temperature and a reduced pressure. Finally, the input solution travels to a falling film stripper and a macrocyclic oligoester substantially free from solvent is collected from the falling film stripper.

In another general embodiment, solvent is removed from an input solution by exposing the feed solution to an elevated temperature and a reduced pressure in a first rising film evaporator. The input solution then travels through a first flash device. The solvent that is removed in the first rising film evaporator and the first flash device travels to a first condenser and the remainder of the input solution travels to a second rising film evaporator where it is exposed to an elevated temperature and a reduced pressure. The input solution then travels through a second flash device. The solvent that is removed in the second rising film evaporator and the second flash device travels to a second condenser. The solvent that has traveled through the first condenser and the second condenser is transported to a liquid receiver. The remainder of the input solution and the solvent travels to a falling film stripper. Optionally, the sparger may operate at the same time as the falling film stripper. Alternatively, a sparger removes gasses and vapors from the input solution after it has traveled through the stripper. Thereafter, a macrocyclic oligoester substantially free from solvent is collected.

When preparing macrocyclic oligoesters by depolymerizing linear polyesters, dilute conditions may be desired to promote cyclization and to increase the yield of macrocylcic oligoesters. As a result, the macrocyclic oligoester solution (e.g., the product solution of a depolymerization reaction) may be dilute (e.g., a 1% by weight macrocyclic oligoester solution).

Figure 2:
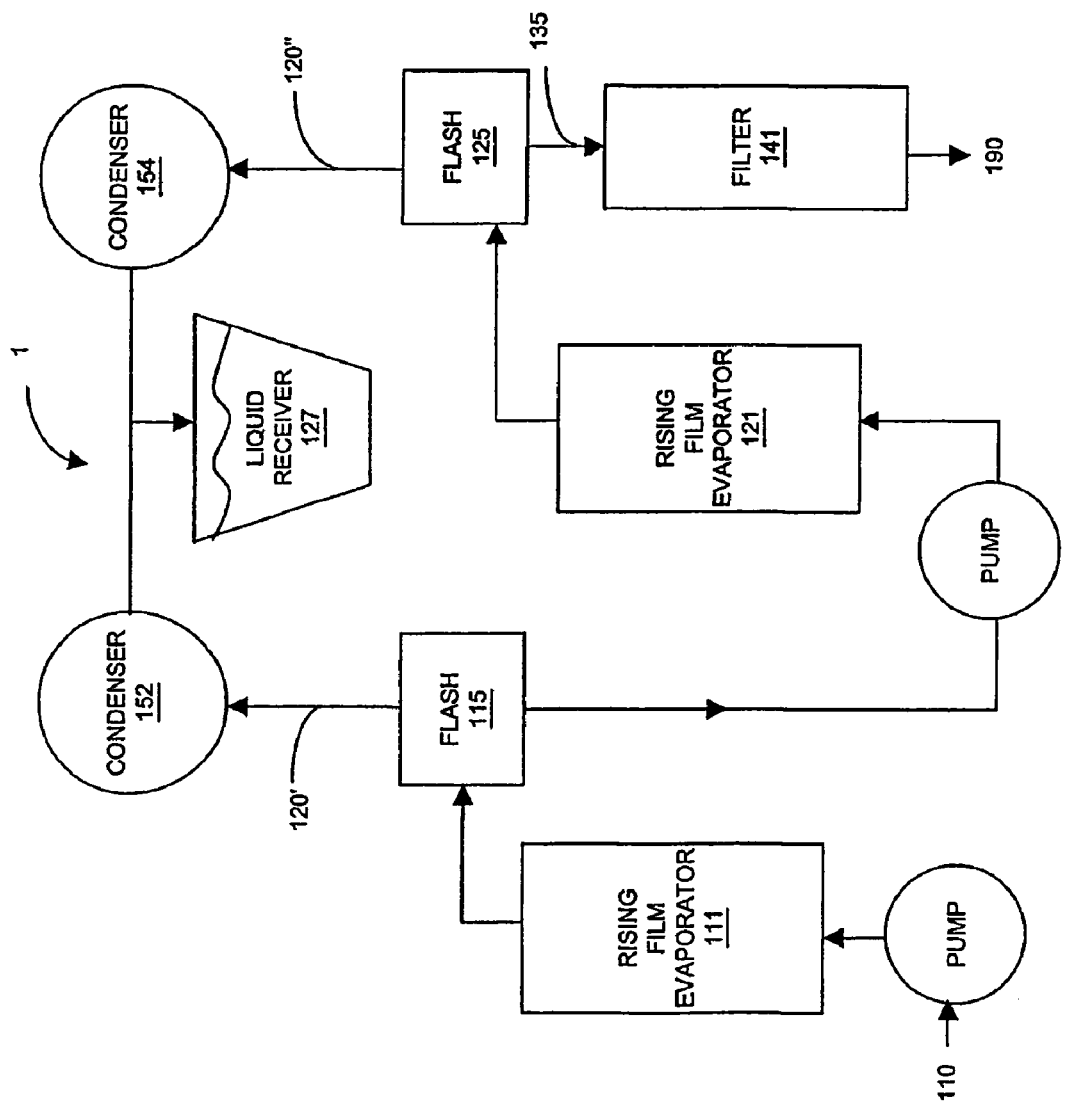
FIG. 2 is a schematic flow diagram of an embodiment of a solvent removal system.

FIG. 2 schematically illustrates an embodiment of a system 1 for solvent removal that is typically employed where the solution is dilute (e.g., less than about 3% by weight macrocyclic oligoester). A linear polyester depolymerization reaction product solution (i.e., the input solution) 110 is pumped into a rising film evaporator 111. Some of the solvent in the solution transitions into the vapor phase as it travels up the rising film evaporator 111 and it then travels though a flash device 115. The solution then is pumped into a second rising film evaporator 121. Thereafter the solution travels through another flash device 125. The solution that exits the flash device 125 travels along path 135 and has a higher macrocyclic oligoester concentration (e.g., an increase from about 1% to about 3%). The vapor phase solvent that is removed from flash devices 115 and 125 travels along paths 120' and 120", is condensed in condensers 152 and 154, and is collected in a liquid receiver 127. The macrocyclic oligoester solution that exits the flash device 125 then travels along path 135 to a filter 141, which removes any remaining linear polyester and/or catalyst from the depolymerization reaction product solution. The filter 141 may be, for example, a Niagara filter or a Sparkler filter. A Niagara filter is a multiple tray filter available from Baker Hughes Corporation (Houston, Tex.). Similarly, a Sparkler filter is a multiple tray filter apparatus available from Sparkler Filters, Inc. (Conroe, Tex.). In one embodiment, a centrifuge is employed alternatively or in addition to the filter 141. A resulting output solution 190 exiting filter 141 may become the input solution in the next solvent removal step.

The output solution 190 may have a macrocyclic oliogester concentration of about 3%. In one embodiment, the rising film evaporator 111 is held at a temperature between about 180° C.-185° C. at atmospheric pressure. In another embodiment, the rising film evaporator 121 is held at temperature between about 180° C.-185° C. at atmospheric pressure. In other embodiments, each rising film evaporator 111 and 121 is held at a temperature between about 120° C. to 280° C. at a pressure ranging from about 0.001 torr to about atmospheric pressure.

Referring again to FIG. 1, when the concentration of microcyclic oligomer input solution 10 is about 3%, two additional rising film evaporators (not shown) may be placed in series between the first rising film evaporator 11 and the second rising film evaporator 21. The two additional rising film evaporators may employ similar conditions as the first rising film evaporator 11 and use steam to heat the macrocyclic oligomer and the solvent (e.g., at about 150° C. under a pressure of about 100 torr).

In one embodiment, the rising film evaporator employs steam to heat the solution to a temperature between about 120° C. to 200° C. In yet another embodiment, the rising film evaporator employs hot oil to heat the solution to between about 200° C. to about 280° C. The rising film evaporators may be operated at pressures ranging from about 0.001 torr to about atmospheric pressure. In one embodiment, between about 80% and about 90% of the solvent in the input solution is removed by each rising film evaporator. Where the input solution has a relatively low concentration of macrocyclic oligoester, multiple rising film evaporators may be employed in multiple steps. In one embodiment, multiple solvent removal apparatus are employed to achieve the desired dryness in the macrocyclic oligoester substantially free from solvent.

Figure 3:
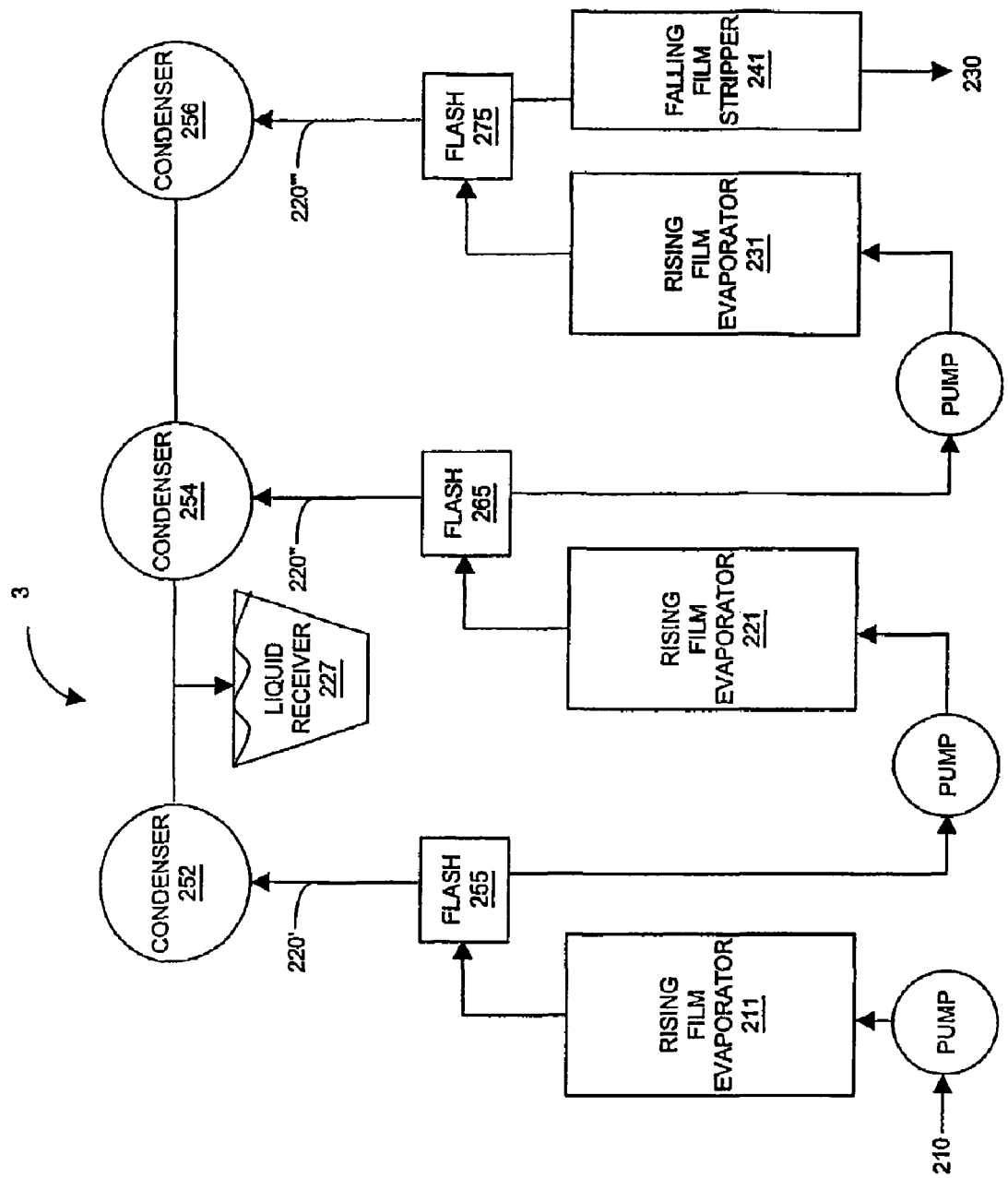
FIG. 3 is a schematic flow diagram of an embodiment of a solvent removal system.

FIG. 3 schematically illustrates another embodiment of a solvent removal system 3. The system shown in FIG. 3 may be used alone or in combination with that of FIG. 2. An input solution 210 is pumped into a first rising film evaporator 211. Thereafter, the solution travels through a first flash device 255. Condenser 252 captures the vaporized solvent that is removed in the first rising film evaporator 211 and the first flash device 255. The solution then travels through a second rising film evaporator 221 to a second flash device 265. Condenser 254 captures the vaporized solvent that is removed in the second rising film evaporator 221 and the second flash device 265. The solution then travels through a third rising film evaporator 231. Subsequently, the solution travels through a third flash device 275. Condenser 256 captures the vaporized solvent that is removed in the third rising film evaporator 231 and the third flash device 275. After traveling through the third flash device 275, the solution travels through the falling film stripper 241. A macrocyclic oligoester output product 230 substantially free from solvent is pumped out of the falling film stripper 241. In one embodiment, the macrocyclic oligoester 230 is in a molten state. The vaporized solvent that is removed from flash device 255, 265, and 275 travels along paths 220', 220", and 220''' and is condensed in condensers 252, 254 and 256, and is collected in the liquid receiver 227.

In another embodiment, the first rising film evaporator has about 20 square feet of evaporation surface area and is maintained at about atmospheric pressure and a temperature of about 185° C. The second rising film evaporator has about 5 square feet of evaporation surface area and is maintained at a pressure of about 1 torr and at a temperature ranging between about 185° C. and about 190° C. The third rising film evaporator has about 1 square foot of evaporation surface area and is maintained at a pressure of about 1 torr and at a temperature ranging between about 185° C. and about 190° C. In this embodiment, the first rising film evaporator, having a relatively large evaporation surface area and being run at atmospheric pressure, typically removes the bulk of solvent from the input solution.

Generally and in one embodiment of the invention, solvent is removed from an input solution of a macrocyclic oligoester by exposing the input solution to an elevated temperature and a reduced pressure in a first short path evaporator. A short path evaporator is used to vaporize part or all of the solvent from a solution. A short path evaporator can operate at a low pressure because, the condenser is located inside of the evaporator. The input solution may then travel to a second short path evaporator where it is exposed to an elevated temperature and a reduced pressure.

Figure 4:
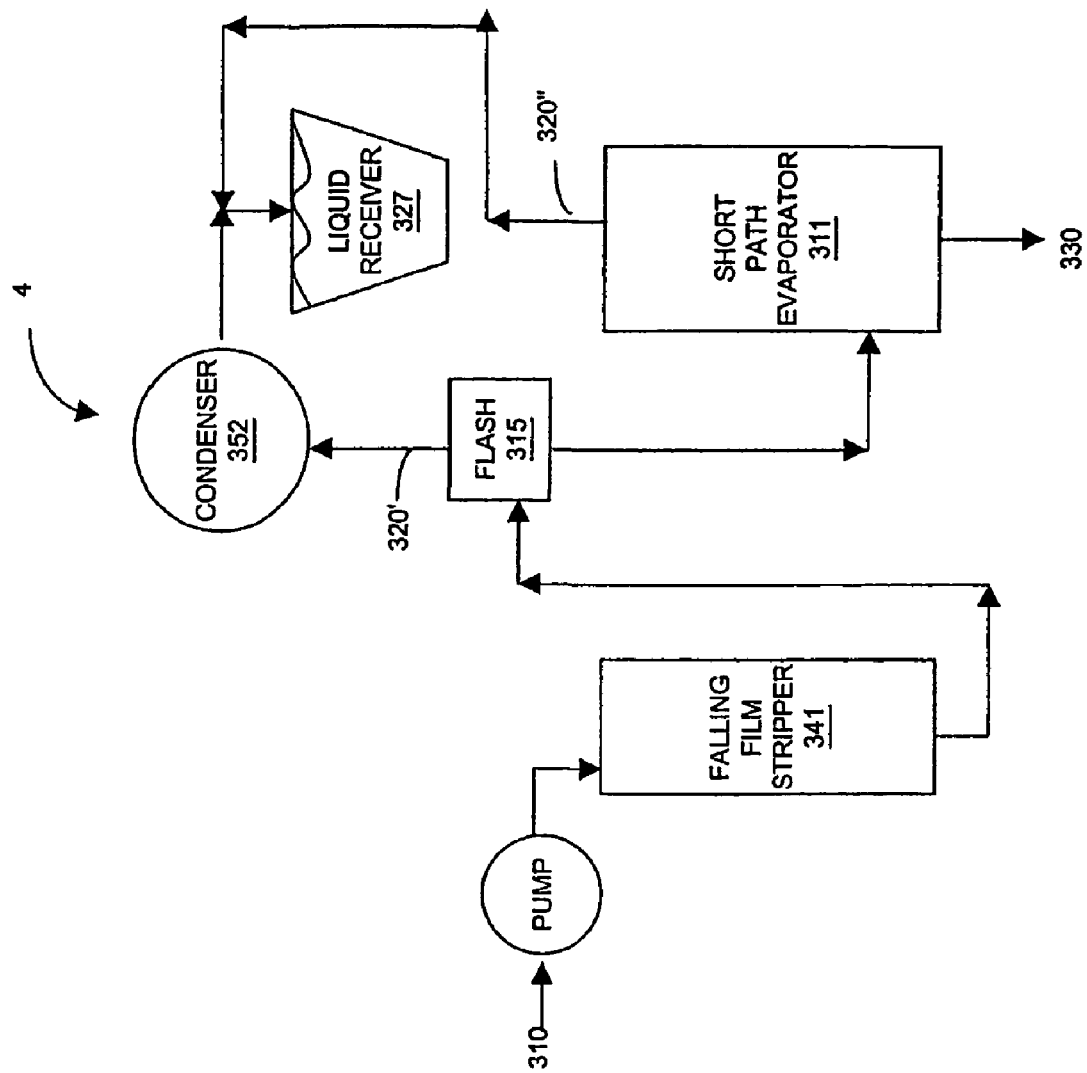
FIG. 4 is a schematic flow diagram of an embodiment of a solvent removal system.

FIG. 4 schematically illustrates another embodiment of a solvent removal system 4. An input solution 310 of a 3% by weight macrocyclic oligoester solution is pumped into the top of a falling film stripper 341. Thereafter, the solution travels through a flash device 315. The solvent that is vaporized in the falling film stripper 341 and the first flash device 315 travels through a path 320' to a condenser 352, and is removed from the solution. The solvent that has traveled through the condenser 352 is transported to a liquid receiver 327. The solution travels to the short path evaporator 311. In the short path evaporator 311 the solution is exposed to an elevated temperature and reduced pressure. The solvent that is vaporized in the short path evaporator 311 is condensed within the short path evaporator 311 and removed from the solution. The solvent removed within the short path evaporator 311 is transported through a path 320" to a liquid receiver 327. A macrocyclic oligoester output product 330 substantially free from solvent exits the short path evaporator 311. In one embodiment, the macrocyclic oligoester 330 is in a molten state. A macrocyclic oligoester substantially free from solvent is collected from the short path evaporator 311.

In one exemplary embodiment the input solution 310 of macrocyclic oligoester is heated to a temperature of about 180° C. and is pumped into the top of the falling film stripper 341 at a rate of about 5900 kg/hr. The falling film stripper 341 is maintained at a temperature of about 180° C. and at about atmospheric pressure. The solution exits the bottom of the falling film stripper 341 at a temperature of about 180° C. The solution enters the flash device 315, which is held at atmospheric pressure and at a temperature of about 180° C. The solution exiting the flash device 315 that enters the short path evaporator 311 is at a temperature of about 180° C. The short path evaporator 311 has 2.4 m² of surface area, is held at a temperature of about 210° C. and at a pressure of about 5 torr. The macrocyclic oligoester output product 330 exits the short path evaporator 311 at a rate of about 181 kg/hr and at a temperature of about 210° C. The output product 330 contains less than 100 ppm of solvent. A suitable falling film stripper 341, flash device 315, and short path evaporator 311 that may be employed in accordance with this exemplary embodiment are available from Incon Processing Technology (Batavia, Ill.).

In one embodiment, a compressor may be employed in place of a condenser. In another embodiment, the compressed gas or the condensed gas exiting the compressor or the condenser, respectively, may be employed as the heat input to one or more of the stripping apparatus and/or the evaporating apparatus. For example, where a shell and tube heat exchanger is employed, the compressed gas exiting a compressor may be fed to the shell side of the heat exchanger.

Generally, where short path evaporators have been employed in the solvent removal process, a sparger may not be necessary to obtain a macrocyclic oligoester substantially free from solvent. Short path evaporators can operate effectively under lower vacuum and at lower temperature conditions, thereby potentially saving energy costs. Also, the time required by the sparging step and the cost of maintaining sparging equipment are avoided when short path evaporators are employed.

Systems, apparatus, and equipment that may be employed or adapted to perform the processes described herein are commercially available, for example, from Artisan Industries Inc. of Waltham, Mass. and from LCI of Charlotte, N.C. Suitable rising film evaporators include heat exchangers available from Troy Boiler (Albany, N.Y). Suitable falling film strippers, condensers and flash devices may be supplied by Artisan Industries Inc. (Waltham, Mass.) and Incon Processing Technology (Batavia, Ill.). Suitable short path evaporators are available from Incon Processing Technology (Batavia, Ill.). Suitable liquid receivers are available from suppliers including, Artisan Industries Inc. (Waltham, Mass.) and Incon Processing Technology (Batavia, Ill.)

Shaping Macrocyclic Oligoesters

In another aspect, the invention features a process for shaping a partially-crystallized macrocyclic oligoester. This process includes providing a substantially solvent-free molten macrocyclic oligoester. The substantially solvent-free molten macrocyclic oligoester is sheared to form a partially-crystallized macrocyclic oligoester, which can be shaped.

In one embodiment, the substantially solvent-free molten macrocyclic oligoester is continuously sheared to form a partially-crystallized macrocyclic oligoester. In another embodiment, shaping of the partially-crystalized macrocyclic oligoester is continuous. In yet another embodiment, the molten macrocyclic oligoester is continuously sheared and the partially-crystallized macrocyclic oligoester is continuously shaped.

Once substantially free from solvent, the macrocyclic oligoester, which may be a molten liquid at the solvent-removal temperature, is cooled and solidified into a usable form. When molten macrocyclic oligoester (such as macrocyclic (1,4-butylene terephthalate)) is cooled quickly, it is typically amorphous. In its amorphous state, the macrocyclic oligoester is sticky and "droplets" tend to agglomerate into a large mass. Amorphous macrocyclic oligoester also absorbs water from the atmosphere, which can be detrimental to subsequent processing.

Shear-induced partial-crystallization is used to facilitate crystallization of the macrocyclic oligoester. According to embodiments of the invention, an extruder, a scraped surface crystallizer, and/or a shear mixer are employed to partially-crystallize the product to form a partially-crystallized macrocyclic oligoester. A shear mixer includes any crystallizer that facilities crystallization by shear mixing. The extruder may be employed to extrude the macrocyclic oligoester at a temperature below the melting point of the macrocyclic oligoester, thereby forming a partially-crystallized macrocyclic oligoester. Shearing may include shearing, cooling, or shearing and cooling simultaneously.

Suitable product forms (e.g., pellets, pastilles, flakes, and prepregs) that are stable in the environment and easy to handle may be obtained by these methods. The partially-crystallized macrocyclic oligoester then may be collected. The collection may be continuously performed depending on the application.

Two or more processes of the invention may be carried out simultaneously. In one embodiment, an extruder removes solvent from the solution of macrocyclic oligoester to form a substantially solvent-free molten macrocyclic oligoester that the extruder shears to form a partially-crystallized macrocyclic oligoester that is shaped into a pellet.

The macrocyclic oligoester may be sheared at a temperature that is lower than the melting point of the macrocyclic oligoester. In one embodiment, the shearing step is conducted at a temperature between about 100° C. and about 165° C. In another embodiment, the shearing step is conducted at a temperature between about 145° C. and about 155° C.

Additionally, one or more of various additives and fillers can be incorporated into the macrocyclic oligoester, before, during or after solvent removal to yield a fully formulated product. For example, in the manufacture of an article, various types of fillers may be included. Filler often is included to achieve a desired property, and may be present in the resulting polyester polymer. The filler may be present to provide stability, such as chemical, thermal or light stability, to the blend material or the polyester polymer product, and/or to increase the strength of the polyester polymer product. A filler also may provide or reduce color, provide weight or bulk to achieve a particular density, provide flame resistance (i.e., be a flame retardant), be a substitute for a more expensive material, facilitate processing, and/or provide other desirable properties as recognized by a skilled artisan.

Illustrative examples of fillers are, among others, fumed silicate, titanium dioxide, calcium carbonate, chopped fibers, fly ash, glass microspheres, micro-balloons, crushed stone, nanoclay, linear polymers, and monomers. One or more fillers may be added before, during, or after the polymerization reaction between-a macrocyclic oligoester and a cyclic ester. For example, fillers may be added to a substantially solvent-free macrocyclic oligoester. Optionally the filler may be added when the substantially solvent-free macrocyclic oligoester is in molten form. Also, fillers can be used to prepare polyester polymer composites.

In some embodiments, additional components (e.g., additives) are added to the macrocyclic oligoesters. Illustrative additives include colorants, pigments, magnetic materials, anti-oxidants, UV stabilizers, plasticizers, fire-retardants, lubricants, and mold releases. In other embodiments, one or more catalysts are added to the macrocyclic oligoester. Exemplary catalysts that may employed in accordance with the invention are described below.

Formulating Macrocyclic Oligoesters

In another aspect, the invention features processes for formulating macrocyclic oligoesters and processes for making prepregs from macrocyclic oligoesters and polymerization catalysts.

In one embodiment, a mixture of a molten macrocyclic oligoester and a polymerization catalyst substantially free from solvent is provided. The mixture of the molten macrocyclic oligoester and polymerization catalyst is deposited onto a fabric material to form a prepreg. In one embodiment, the molten macrocyclic oligoester and polymerization catalyst are partially-crystallized prior to being deposited onto the fabric material.

A mixture of a molten macrocyclic oligoester and a polymerization catalyst substantially free from solvent may be continuously provided. The mixture of the macrocyclic oligoester and the polymerization catalyst may be partially crystallized. In one embodiment, the mixture is continuously partially crystallized. The partially-crystallized mixture of the macrocyclic oligoester and the polymerization catalyst then may be deposited onto a fabric material. In another embodiment, the partially-crystallized mixture is continuously deposited onto a fabric material.

In other embodiments, a macrocyclic oligoester (e.g., pellets) is fed to a hot mixing device (e.g., an extruder or a Readco mixer) with other solid or liquid additives (e.g., stabilizers or polymerization catalysts) with or without fillers. The m device partially melts the macrocyclic oligoester into a paste to enhance mixing and flow. The formulated product, which remains partially crystalline, then is formed into shapes such as pellets, flakes, pastilles, and/or applied directly to a fabric material to make a prepreg. This method typically avoids the problems of handling amorphous macrocyclic oligoester.

In yet other embodiments, the partially-crystallized mixture of molten macrocyclic oligoester and polymerization catalyst is deposited onto a fabric material. In certain embodiments the molten macrocyclic oligoester and polymerization catalyst are shear mixed in a shear mixer; alternatively, they may be processed in an extruder. The shear-mixing may be conducted at a temperature between about 145° C. and about 155° C. The fabric material(s) may be selected from the group of fiber tow, fiber web, fiber mat, felt, non-woven material, and random and woven material.

Prior to partial-crystallization, the molten macrocyclic oligoester may contain less than about 200 ppm of solvent. Preferably, the molten macrocyclic oligoester contains less than about 100 ppm of solvent. More preferably, the molten macrocyclic oligoester contains less than about 50 ppm of solvent or less than about 10 ppm of solvent.

The partially-crystallized mixture of the macrocyclic oligoester and the polymerization catalyst may be deposited onto the fabric material in a pre-selected array. In addition, the fabric material having the mixture of macrocyclic oligoester and polymerization catalyst deposited thereon may be formed into a desired shape, for example, an autobody panel shape. One or more additives may be added to the molten macrocyclic oligoester. Exemplary additives may be selected from the group of colorants, pigments, magnetic materials, anti-oxidants, UV stabilizers, plasticizers, fire-retardants, lubricants, and mold releases.

In one embodiment, the molten macrocyclic oligoester and polymerization catalyst are partially-crystallized prior to being deposited onto the fabric material. The mixture of molton macrocyclic oligoester and polymerization catalyst may be partially-crystallized by, for example, shear mixing. In certain embodiments, shear mixing is conducted within a temperature range between about 145° C. and about 155° C. In other embodiments the mixture of molton macrocyclic oligoester and polymerization catalyst is partially-crystallized by extrusion, which is often conducted within a temperature range between about 145° C. and about 155° C.

The partially-crystallized mixture of macrocyclic oligoester and polymerization catalyst may be deposited onto the fabric material in discrete droplets of a selected size according to a pattern of a pre-selected array. In certain embodiments, the molten macrocyclic oligoester is mixed with one or more additive(s) and/or filler(s). The fabric material may be selected from the group of fiber tow, fiber web, fiber mat, felt, non-woven material, random, and woven material. The fabric material employed in a prepreg may vary depending on the end use application of the prepreg. Also, the fiber used to make the fiber material, or any fiber sizing agents or other agents present on the fiber material, may impact the suitability of the fiber material for use in a prepreg. For example, some catalysts and/or macrocyclic oligoester and polymerization catalyst mixtures may interact with the fibers and/or any sizing or other agents that are present on the fabric material.

In some embodiments, the partial crystallization step occurs continuously. In other embodiments, the partially-crystallized mixture of macrocyclic oligoester and the polymerization catalyst is continuously deposited on the fabric material. In still other embodiments, the process of making the prepreg is continuous whereby the mixture of a molten macrocyclic oligoester and a polymerization catalyst, which is substantially free from solvent, is continuously provided, continuously partially-crystallized, then continuously deposited onto a fabric material.

In another embodiments, the process of solvent removal and the process of prepreg formation are combined, creating a continuous process from the feed solution of a macrocyclic oligoester to formation of prepregs of macrocyclic oligoester substantially free from the solvent. The prepregs may contain one or more additives and a polymerization catalyst. Such continuous processes may provide advantages in many aspects such as in reducing energy cost and processing time and optimizing equipment usage.

Figure 5:
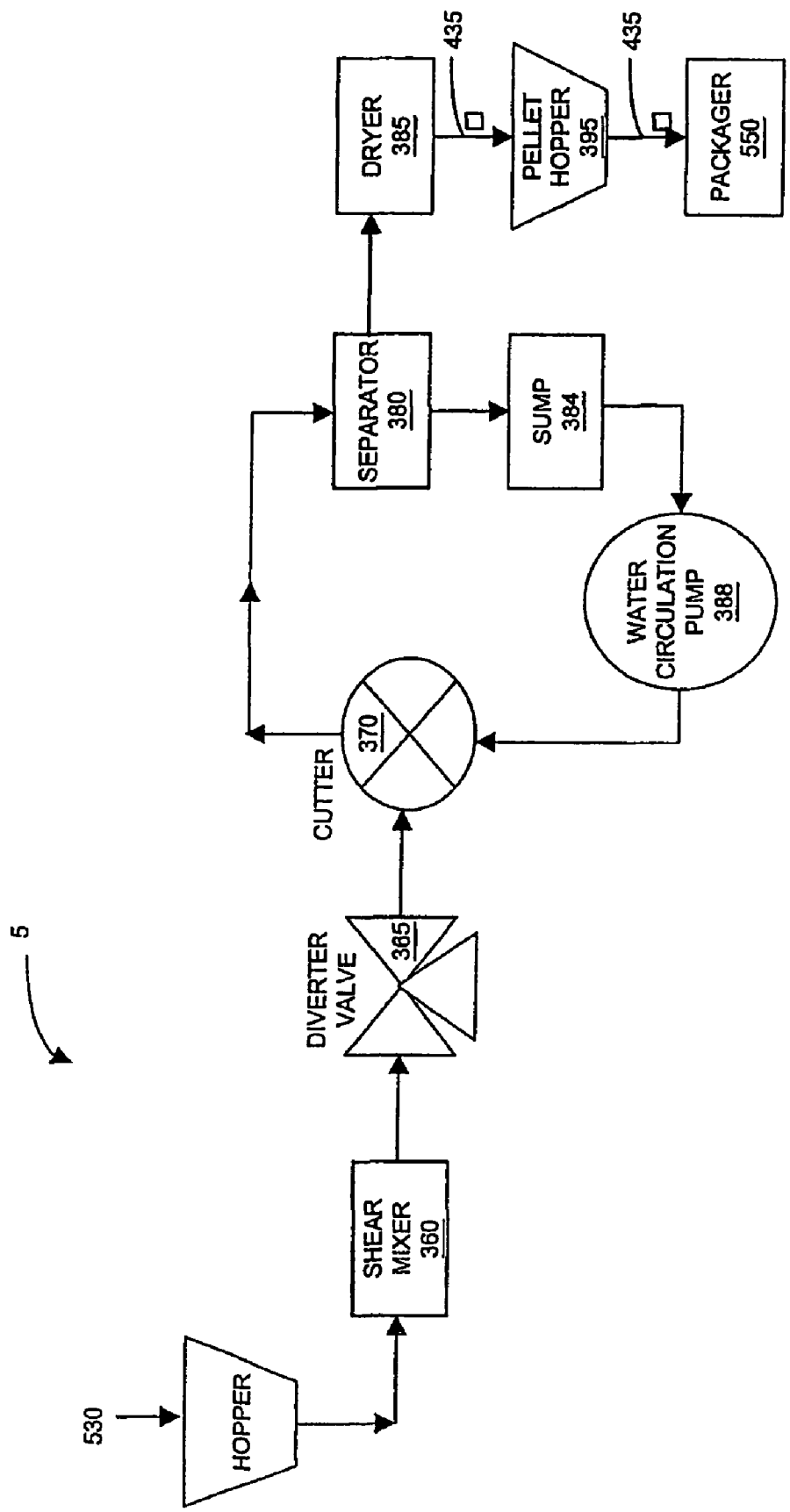
FIG. 5 is a schematic flow diagram of an embodiment of a process for making pellets from a macrocyclic oligoester.

FIG. 5 schematically illustrates one embodiment of a process 5 for making pellets from a molten product with an underwater pelletizer. In this embodiment, a molten macrocyclic oligoester 530, which is substantially free from solvent, is fed into a shear mixer 360. The shear mixer 360 is connected to a temperature control loop (not shown). The shear mixer 360 may be a Readco mixer (York, Pa.), which is like a twin screw extruder, but less heavy duty. The molten macrocyclic oligoester within the shear mixer 360 is typically cooled to a temperature between about 80° C. and about 140° C., preferably between about 130° C. and about 140° C. By lowering the temperature in the shear mixer 360, the macrocyclic oligomer is crystallized partially and is paste-like. Generally, the partially-crystallized macrocyclic oligomer employed to make pellets 435 measures between about 3000 cp. (centipoise) and about 5000 cp., which typically indicates that about 30% of the macrocyclic oligomer is crystallized.

The partially-crystallized macrocyclic oligomer travels from the shear mixer 360 to a diverter valve 365. The diverter valve 365 may be used to divert the product from the process to, for example, a bucket when the pelletizer starts up. The diverter 365 typically is used to ensure that the partially-crystallized macrocyclic oligoester is traveling to the upstream cutter 370 at a minimum velocity. A suitable diverter 365 and a suitable cutter 370 may be available from Gala Industries (Eagle Rock, Va.), Incon Processing Technology (Batavia, Ill.), and/or Artisan Industries Inc. (Waltham, Mass.). After a minimum velocity is achieved, the partially-crystallized macrocyclic oligomer travels to the cutter 370. At the cutter 370, the partially-crystallized paste-like macrocyclic oligomer is cut into the shape of pellets in a slurry of water. One or more pellets may be cut by the cutter 370 at once. The pellets are then removed from the slurry of water into a separator 380. The separator 380 may be a screen, which may be a moving belt. A suitable separator 380, may be available from Gala Industries (Eagle Rock, Va.), Incon Processing Technology (Batavia, Ill.), and/or Artisan Industries Inc. (Waltham, Mass.). Subsequently, the pellets 435 are dried in a dryer 385 and then transferred to a pellet hopper 395 and a packager 550. The dryer 385 may be a fluid bed dryer available from Kason Corporation (Milburn, N.J.). A suitable pellet hopper 395 and a suitable packager 550 may be available from Gala Industries (Eagle Rock, Va.), Incon Processing Technology (Batavia, Ill.), and/or Artisan Industries Inc. (Waltham, Mass.). As depicted, the water that was separated from the pellets is recycled through a sump 384 and a water circulation pump 388. A suitable sump 384 and a suitable circulation pump 388 may be available from Gala Industries (Eagle Rock, Va.), Incon Processing Technology (Batavia, Ill.), and/or Artisan Industries Inc. (Waltham, Mass.).

Figure 6:
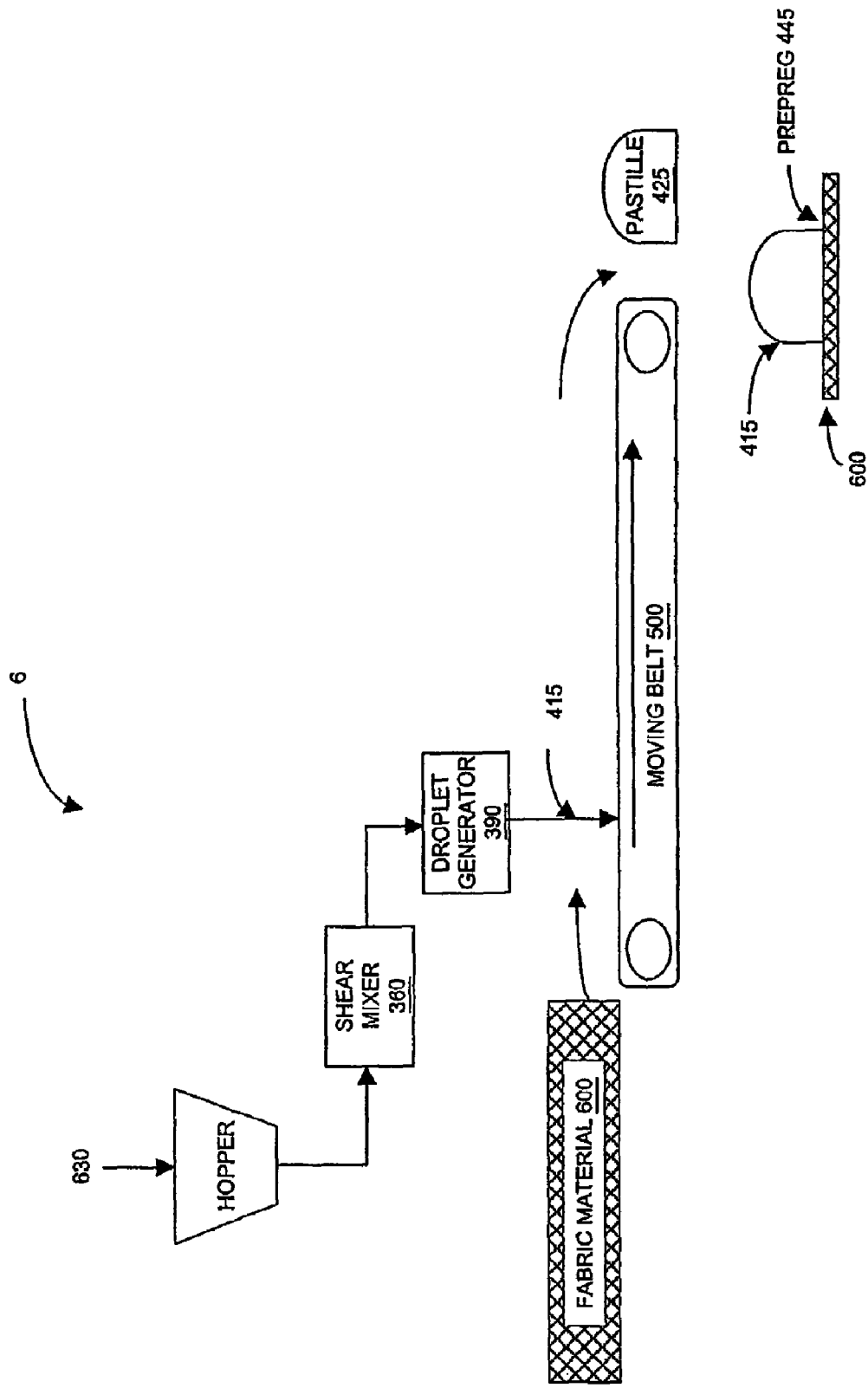
FIG. 6 is a schematic flow diagram of an embodiment of a pastillation process (e.g., making prepregs from a macrocyclic oligoester).

FIG. 6 schematically illustrates an embodiment of a process 6 for making either prepreg or pastille from a molten product utilizing a pastillation process. A molten macrocyclic oligoester 630, which is substantially free from solvent, is fed into a shear mixer 360 that is connected to a temperature control loop (not shown) to control the temperature of the shear mixer 360. The molten macrocyclic oligomer within the shear mixer 360 is typically cooled to a temperature between about 80° C. and about 140° C., preferably between about 130° C. and about 140° C.

In certain embodiments, the temperature control loop maintains the shear mixer 360 at a temperature of about 100° C. In other embodiments, the shear mixer 360 is an extruder. In yet other embodiments, the shear mixer 360 is a Readco mixer (York, Pa.), which is like a twin screw extruder, but less heavy duty.

By lowering the temperature in the shear mixer, the macrocyclic oligomer is partially crystallized and becomes paste-like. The temperature and/or the level of shear provided to produce the paste-like macrocyclic oligomer varies according to the composition of the macrocyclic oligomer, including the presence of any additives. Generally, the partially-crystallized macrocyclic oligomer employed to make pastilles measures between about 500 cp. and about 1000 cp., which typically indicates that it is between about 15% and about 20% crystallized. The molten macrocyclic oligomer may contain some residual solvent (e.g., between about 100 ppm and about 10 ppm) as the molten resin enters the shaping process at a temperature between about 150° C. and about 200° C.

Both prepregs and pastilles can be made from the partially-crystallized and paste-like macrocyclic oligomer utilizing pastillation equipment. The partially-crystallized paste-like macrocyclic oligomer travels from the shear mixer 360 and enters a droplet generator 390. The droplet generator 390 is employed to malice desired sized droplets of macrocyclic oligoester. In one embodiment, a Sandvik Rotoformer available from Sandvik Process Systems of Totowa, N.J. is employed to make droplets. When pastilles 425 are manufactured, the droplet generator 390 may drop pastilles 325 directly onto a moving belt 500.

The moving belt 500 may be of any length and size and is typically between about 50 feet to about 100 feet in length. The bottom side of the moving belt 500 may be cooled, for example, by providing water underneath the moving belt 500. The length of the moving belt 500 and the cooling method can be selected to cool the pastilles 425 before the end of the moving belt 500. In some embodiments, a scraping bar (not shown) is employed at the end of the moving belt 500 to remove the pastilles 425 from the moving belt 500. In one embodiment, a moving belt 500 available from Sandvik Process Systems of Totowa, N.J. is employed.

When a prepreg 445 is manufactured, the droplet generator 390 may drop the material 415 (e.g., macrocyclic oligoester plus a polymerization catalyst) onto a fabric material 600 that is fed onto the moving belt 500. The length of the moving belt 500 and any cooling method will be selected to cool the material 415 into the fabric material 600, forming the prepreg 445.

In some embodiments, an underwater pelletizer is used for making pellets. In For example, a Gala type underwater pelletizer (available from Gala Industries, Inc. of Eagle Rock, Va.) may be used for malaing pellets. Alternatively, a pastillator may be used for forming pastilles. For example, a Sandvik Rotoformer (available from Sandvik Process Systems of Totowa, N.J.) may be used to form pastilles.

In yet another aspect of the invention, the process of solvent removal and the process of shaping a partially-crystallized macrocyclic oligoester are combined, creating a continuous process from feeding a solution of a macrocyclic oligoester to shaping the macrocyclic oligoester. For example, in one embodiment, the process of solvent removal and the process of pastillation may be combined, thereby creating a continuous process from input solution of a macrocyclic oligoester to pastilles of macrocyclic oligoester substantially free from the solvent. In one embodiment, a solution of macrocyclic oligoester is provided. During the solvent removal process, the temperature often is elevated to between about 180° C. and about 200° C., and the pressure maintained between about atmospheric pressure and about 10 torr. In these embodiments, the solvent is continuously removed to produce a substantially solvent-free molten macrocyclic oligoester.

The substantially solvent-free molten macrocyclic oligoester may be sheared at a temperature below the melting point of the molten macrocyclic oligoester to form a partially-crystallized macrocyclic oligoester. The shearing temperature may be maintained at, for example, between about 145° C. and about 155° C. Subsequently, the partially-crystallized macrocyclic oligoester may be formed into any desirable shapes including pellets, pastilles, and flakes.

Additives and fillers may be formulated with a macrocyclic oligoester or with a mixture of a macrocyclic oligoester and a catalyst. In one embodiment, the additive(s) and/or filler(s) are formulated with a macrocyclic oligoester while the latter macrocyclic oligoester is completely molten. In other embodiments, the additive(s) and/or filler(s) are formulated with a macrocyclic oligoester while the latter macrocyclic oligoester is partially molten and partially crystalline. In yet other embodiments, the additive(s) and/or filler(s) are formulated with a macrocyclic oligoester while the macrocyclic oligoester is completely crystalline. The formulated macrocyclic oligoester is prepared into a prepreg in the form of pastilles on a fabric material.

Pastille prepregs may be prepared from a blend material that includes macrocyclic oligoesters. In one embodiment, the invention relates to methods for preparing pastille thermoplastic prepregs based on a blend material that includes at least one macrocyclic oligoester and at least one polymerization catalyst.

Thermoplastic prepregs typically have been produced with the resin close to the fiber. If the melt viscosity of the resin is high, the resin needs to be close to the fiber in order to wet-out the fiber properly. This typically is the case with thermoplastic prepregs made using a hot melt method with thermoplastic powder, co-mingled tows of reinforcing fiber and thermoplastic fiber, or co-woven fabrics. These materials require a process which often includes three steps: 1) heating and melting the resin, 2) wetting out of the fiber and consolidating, and 3) cooling down and solidifying.

Macrocyclic oligoesters, as discussed above, melt to a low viscosity that may be many orders of magnitude lower than the viscosity of conventional thermoplastics. Thus, combining and wetting-out of macrocyclic oligoesters (when melted) with fillers and/or reinforcing fibers during the heating cycle of a process can be done much more easily than conventional thermoplastics. Hence, in prepreg fabrics made with macrocyclic oligoesters, the resin does not need to be distributed as close to the fiber (i.e., each and every fiber) as is needed for conventional thermoplastics. That is, resin can be placed at discrete locations, but melt and flow to wet-out the entire fabric when the resin is melted.

Figure 7:
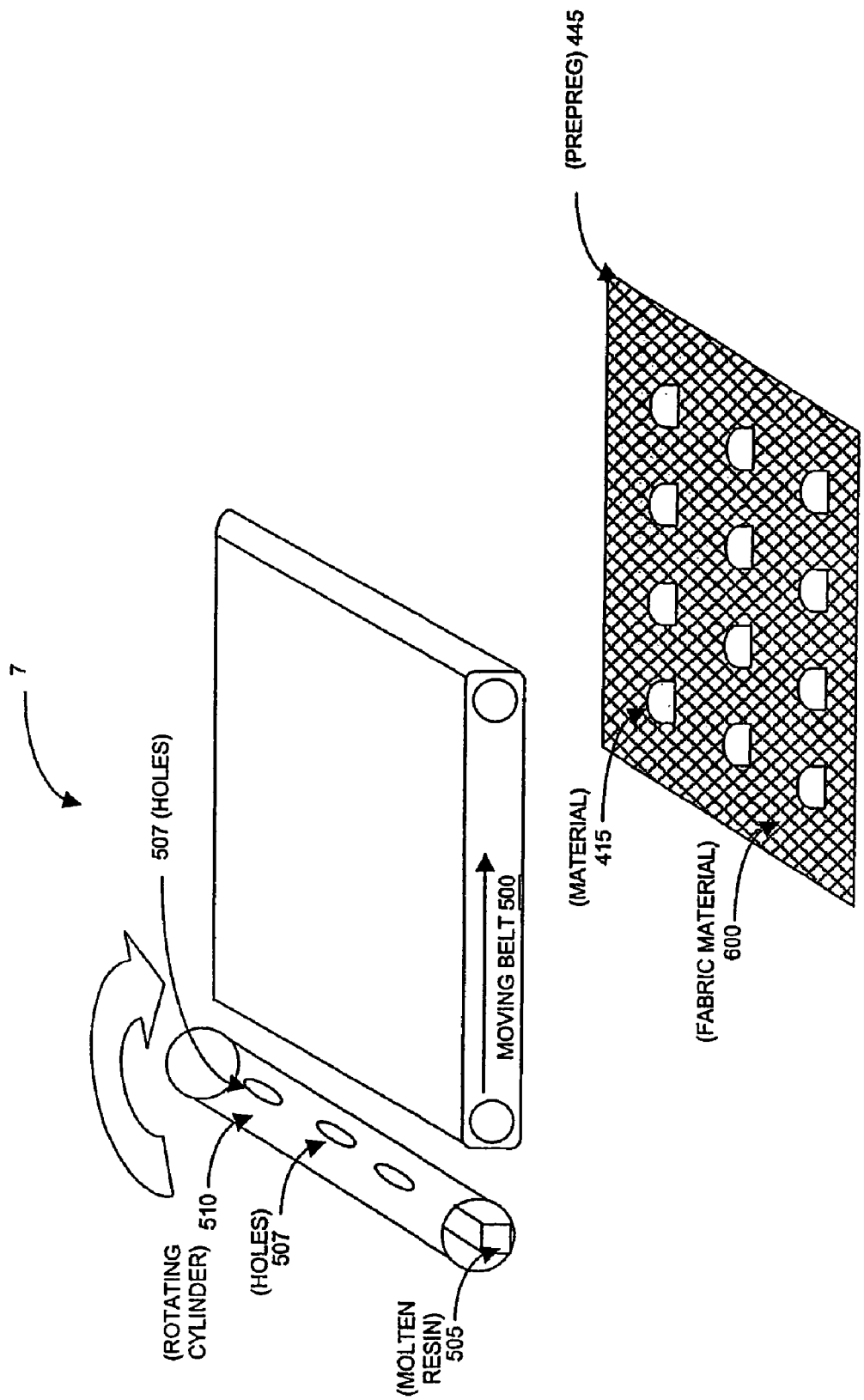
FIG. 7 is a schematic illustration of an embodiment of a process for making a prepreg from a macrocyclic oligoester.

When a prepreg is made with a blend material that includes a macrocyclic oligoester, the blend material can be a one-part ready-to-use system with a catalyst already included. FIG. 7 illustrates one embodiment of the invention, a process 7 for making a prepreg 445 from a macrocyclic oligoester or a blend material of macrocyclic oligoester with one or more other components such as a polymerization catalyst. The process allows the making of a prepreg 445 that has the desired resin and fabric material in a pre-selected ratio. Such prepregs can simplify upstream processes employing prepregs.

Referring to FIG. 7, a blend material (e.g., a one-part system) is melted and applied to a reinforcing fabric 600 in discreet resin drops 415 and then cooled before significant polymerization takes place. The molten resin 505 is pumped into a channel in the bottom of a rotating cylinder 510 and comes out through the holes 507 in the cylinder each time the holes 507 line up with the channel. In one embodiment, a rotating cylinder 510 available from Sandvik Process Systems of Totowa, N.J. is employed in the process. Consequently, liquid drops of resin fall at pre-determined intervals onto a moving belt 500 (e.g., a steel belt). These discrete resin drops 415 can be arranged in a pre-selected array (e.g., a pattern) so that the amount of resin is uniform per unit fabric area (if uniformity is desired) and is of a desired value. In one embodiment, the amount of resin per unit fabric area ranges from about 3% by weight resin to about 97% by weight resin. In another embodiment, the amount of resin per unit fabric area ranges from about 30% by weight resin to about 80% by weight resin.

The amount, pattern, and spacing of the dropped resin determine the "average" ratio of fabric material to resin before the resin is melted and distributed throughout the fabric material. There is no limitation as to the amount and pattern of the resin drops as long as the desired preregs are formed. The ratio of fabric material to resin may be uniform or varied across the prepreg and can be manipulated by controlling the size of each drop of resin and the space between them.

FIG. 8 illustrates a schematic flow diagram of an embodiment of a solvent removal system where the solvent removal system 1 illustrated in FIG. 2 is linked with the solvent removal system 2 illustrated in FIG. 1. According to this embodiment, which is typically employed where the linear polyester depolymerization reaction product solution (i.e., the input solution) is a dilute (e.g., about 1% by weight macrocyclic oligoester), input solution 110 is first processed though system 1 to yield a resulting output solution 190. The solution 190 that is the product of system 1 typically contains about 3% by weight macrocyclic oligoester. The solution 190 enters system 2 as input solution 10. The input solution 10 is processed thorough system 2 to yield an output product 130 substantially free from solvent.

FIG. 9 is a schematic flow diagram of an embodiment of a system for shaping macrocyclic oligoesters from a solution of macrocyclic oligoester and solvent. According to this embodiment, the linked solvent removal systems 1 and 2, described above, are further linked to the process 5 for making pellets from a molten product illustrated in FIG. 5. The input solution 110 is a dilute solution (e.g., about 1% by weight macrocyclic oligoester) which is first processed though system 1 to yield a resulting output solution 190. The solution 190 that is the product of system 1 typically contains about 3% by weight macrocyclic oligoester. Solution 190 enters system 2 as input solution 10 and is processed thorough system 2 to yield an output product 130 substantially free from solvent. The output product 130 may be molten. Output product 130 enters process 5 as molten macrocyclic oligoester 530, which is processed through system 5 to yield pellet 435.

FIG. 10 is a schematic flow diagram of an embodiment of a system for shaping macrocyclic oligoesters from a solution of macrocyclic oligoester and solvent. According to this embodiment, the solvent removal system 2 is linked to the process 5, described above, which make pellets from a molten product. According to this embodiment, the input solution 10 containing about 3% by weight macrocyclic oligoester is processed thorough system 2 to yield an output product 130 substantially free from solvent. In one embodiment, the output product 130 is molten. Output product 130 enters system 5 as molten macrocyclic oligoester 530, which is processed through system 5 to yield pellet 435.

Just as the processes in FIG. 8-10 can be linked to provide increased benefits, in other variations of such embodiments (not shown), alternative solvent removal system(s), for example, systems 1, 2, 3, and 4, described above with reference to FIGS. 1-4, may be linked to one another and/or to processes for shaping macrocyclic oligoesters from a solution of macrocyclic oligoester and solvent, such as, for example, processes 5, 6, and 7, described above with reference to FIGS. 5-7. For example, referring again to FIG. 8, FIG. 9, and FIG. 10 the solvent removal system 2 can be replaced by system 3 (FIG. 3) or system 4 (FIG. 4). Referring still to FIG. 9, and FIG. 10, the shaping process 5 can be replaced by process 6 (FIG. 6).

The advantages of the above systems, processes and product prepregs include the ability to "drape" easily into a mold, the ability to flex without cracking and crumbling the resin drops, and the ability to use conventional pastillation equipment. Also, instead of placing the pellets on a conveyor belt, they are placed on a reinforcing fabric. In addition, the processes can be conducted isothermally (i.e. at constant temperature) and in a vacuum bag or in a compression molding press.

Catalysts may be formulated with macrocyclic oligoesters to prepare prepregs. Catalysts may be part of a blend material of macrocyclic oligoesters, see U.S. Pat. No. 6,369,157, the entire contents of which is incorporated by reference herein, or may be added before or during the formulation processes described herein. Catalysts that may be employed in the invention include those that are capable of catalyzing a transesterification polymerization of a macrocyclic oligoester. As with state-of-the-art processes for polymerizing macrocyclic oligoesters, organotin, and organotitanate compounds are the preferred catalysts, although other catalysts may be used. Detailed description of polymerization catalysts can be found in commonly assigned U.S. Ser. No. 09/754,943 entitled "Macrocyclic Polyester Oligomers and Processes for Polymerizing the Same" by Winckler et al., U.S. Ser. No. 10/102,162 entitled "Catalytic Systems" by Wang, and U.S. Ser. No. 10/040,530 entitled "Polymer-Containing Organo-Metal Catalysts" by Wang, the entire contents of which are incorporated by reference herein.

Illustrative examples of classes of tin compounds that may be used in the invention includes monoalkyltin(IV) hydroxide oxides, monoalkyltin(IV) chloride dihydroxides, dialkyltin (IV) oxides, bistrialkyltin(IV) oxides, monoalkyltin(IV) trisalkoxides, dialkyltin(IV) dialkoxides, trialkyltin(IV) alkoxides, tin compounds having the formula (II):

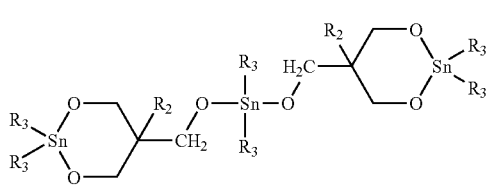

and tin compounds having the formula (III):

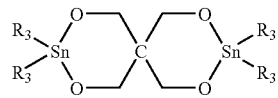

wherein $R_2$ is a $C_{1-4}$ primary alkyl group, and $R_3$ is $C_{1-10}$ alkyl group.

Specific examples of organotin compounds that may be used in this invention include dibutyltin dioxide, 1,1,6,6-tetra-n-butyl-1,6-distanna-2,5,7,10-tetraoxacyclodecane, n-butyltin(IV) chloride dihydroxide, di-n-butyltin(IV) oxide, dibutyltin dioxide, di-n-octyltin oxide, n-butyltin tri-n-butoxide, di-n-butyltin(IV) di-n-butoxide, 2,2-di-n-butyl-2-stana-1,3-dioxacycloheptane, and tributyltin ethoxide. See e.g., U.S. Pat. No. 5,348,985 to Pearce et al. In addition, tin catalysts described in commonly owned U.S. Ser. No. 09/754,943 (incorporated herein by reference in its entirety) may be used in the polymerization reaction.

Titanate compounds that may be used in the invention include titanate compounds described in commonly owned U.S. Ser. No. 09/754,943. Illustrative examples include tetraalkyl titanates (e.g., tetra(2-ethylhexyl) titanate, tetraisopropyl titanate, and tetrabutyl titanate), isopropyl titanate, titanate tetraalkoxide. Other illustrative examples include (a) titanate compounds having the formula (IV):

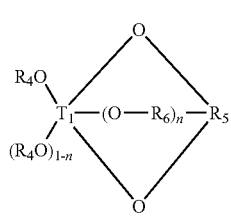

wherein each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1, (b) titanate ester compounds having at least one moiety of the formula (V):

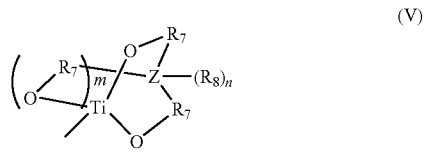

wherein each $R_7$ is independently a $C_{2-3}$ alkylene group; Z is O or N; $R_8$ is a $C_{1-6}$ alkyl group or unsubstituted or substituted phenyl group; provided when Z is O, m=n=0, and when Z is N, m=0 or 1 and m+n=1, and (c) titanate ester compounds having at least one moiety of the formula (VI):

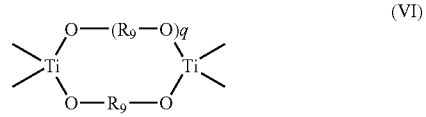

wherein each $R_9$ is independently a $C_{2-6}$ alkylene group; and q is 0 or 1.

The compositions and methods of the invention may be used to manufacture articles of various size and shape from various macrocyclic oligoesters. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

EXAMPLES

The following examples are provided to further illustrate and to facilitate the understanding of the invention. These specific examples are intended to be illustrative of the invention.

Example A

The macrocyclic oligoesters used in the following examples are the macrocyclic oligoesters of 1,4-butylene terephthalate. The macrocyclic oligoesters were prepared by heating a mixture of polyester linears, organic solvents, such as o-xylene and o-dichlorobenzene, which are substantially free from oxygen and water, and tin or titanium compounds as transesterification catalysts. See U.S. Pat. No. 5,668,186 (incorporated herein by reference in its entirety).

Example 1

Preparation of Macrocyclic (1,4-butylene terephthalate) Oligomer Pellets

Macrocyclic (1,4-butylene terephthalate) oligoester powder was fed at a rate of about 9 kg/hr through an extruder at about 120° C. to melt into a paste and processed at a rate of about 9 kg/hr through a Gala underwater pelletizer available from Gala Industries (Eagle Rock, Va.). No die freeze off was observed. The material cut cleanly on the die face. The pellets were strained out of the water and air dried to contain 80 ppm or less of water.

Example 2

Macrocyclic (1,4-butylene terephthalate) Oligomer Pastilles

Macrocyclic (1,4-butylene terephthalate) oligomer powder containing less than 1,000 ppm solvent was melted in a tank at about 170° C. and fed at a rate of 60 kg/hr to a Sandvik Rotoformer to form pastilles. No partial-crystallization was used. The pastilles were amorphous and agglomerated together. The macrocyclic (1,4-butylene terephthalate) oligomer was pastilled smoothly into pastilles.

Example 3

Formulated Macrocyclic (1,4-butylene terephthalate) Oligomer Pastilles

Macrocyclic (1,4butylene terephthalate) oligoester powder was melted and melt blended at a temperature between about 120° C. and about 140° C. with additives including a polymerization catalyst (0.33% by weight FASTCAT 4101 (Atofina, Philadelphia, Pa.)) and thermal stabilizers (0.4% by weight IRGANOX 1010 (Ciba Specialty Chemicals Corporation, Tarrytown, N.Y.)). The formulated product was then fed at a rate of about 45 kg/hr to the Sandvik Rotoformer to form pastilles, as in Example 2.

Example 4

Formulated Macrocyclic (1,4-butylene terephthalate) Oligomer Pastilles on Glass Mat Macrocyclic (1,4butylene terephthalate) oligoester powder was melt blended with catalyst (0.33% by weight FASTCAT 4101 catalyst) and stabilizers (0.4% by weight IRGANOX 1010) and pastilled onto glass mat attached to the Sandvik Rotoformer belt. The Macrocyclic (1,4-butylene terephthalate) oligoester contained less than 1000 ppm solvent. The weight of macrocyclic (1,4butylene terephthalate) oligoester deposited onto an area of glass mat was controlled to between about 400 g/m$^2$ to about 800 g/m$^2$. The pastilles had a hemispherical shape and were about 7 mm in diameter, the pastilles were spaced about 15 mm apart from one another. The glass mat prepreg was flexible, with good adhesion of the macrocyclic (1,4-butylene terephthalate) oligoester pastilles. This prepreg mat can be cured to crystallize the macrocyclic (1,4-butylene terephthalate) oligoester to reduce moisture adsorption and tack. The prepreg was polymerized at a temperature of about 190° C. to high molecular weight polyester (about 80,000 Dalton).

Example 5

Solvent Removal Via Stripping

A solution of macrocyclic (1,4-butylene terephthalate) oligoester in o-dichlorobenzene was fed to an Artisan evaporative stripper from Artisan Industries, Inc. (Waltham, Mass.) A two-stage flash evaporator was operated at a temperature ranging between about 180° C. and about 220° C. and at a pressure ranging between about 10 torr and about atmospheric pressure to concentrate a 10% solution of macrocyclic (1,4butylene terephthalate) oligomer to less than 100 ppm o-dichlorobenzene.

Example 6

Solvent Removal Via Evaporation and Stripping

An input solution of 3% by weight macrocyclic (1,4-butylene terephthalate) oligoester in o-dichlorobenzene solution was fed at a rate of about 6,045 kg/hr into a series of rising film evaporators and a falling film stripper available from Artisan Industries, Inc. to produce an output solution with solvent levels of less than 100 ppm at a rate of about 181 kg/hr.

In one embodiment, the input solution, having a temperature of about 65° C., is fed at a rate of about 6,045 kg/hr into a first rising film evaporator having an evaporation surface area of about 317 ft$^2$. The first rising film evaporator is held at temperature of about 180° C. at atmospheric pressure. Thereafter, the solution exits the first rising film evaporator and enters a first flash device. The first flash device is held at temperature of about 180° C. at atmospheric pressure. A first condenser captures the vaporized solvent that is removed in the first rising film evaporator and the first flash device.

The solution exits the first flash device and travels at a temperature of about 180° C. to a second rising film evaporator. The second rising film evaporator has an evaporation surface area of about 81 ft$^2$ and is held at a temperature of about 193° C. at atmospheric pressure. The solution exiting the second rising film evaporator has a temperature of about 193° C. and enters a second flash device. The second flash device is held at a temperature of about 180° C. at atmospheric pressure. A second condenser captures the vaporized solvent that is removed in the second rising film evaporator and the second flash device.

The solution exits the second flash device and travels to a third rising film evaporator. The third rising film evaporator has an evaporation surface area of about 21 ft$^2$ and is held at temperature of about 199° C. at atmospheric pressure. Thereafter, the solution exits the third rising film evaporator at a temperature of about 199° C. and enters a third flash device. The third flash device is held at a temperature of about 180° C. at atmospheric pressure. A third condenser captures the vaporized solvent that is removed in the third rising film evaporator and the third flash device.

The solution exits the third flash device and travels to a fourth rising film evaporator. The fourth rising film evaporator has an evaporation surface area of about 8 ft$^2$ and is held at temperature of about 204° C. at atmospheric pressure. Thereafter, the solution exits the fourth rising film evaporator at a temperature of about 204° C. and enters a fourth flash device. The fourth flash device is held at a temperature of about 180° C. at atmospheric pressure. A fourth condenser captures the vaporized solvent that is removed in the fourth rising film evaporator and the fourth flash device. Each of the four condensers employ cooling water to condense the vaporized solvent and bring the condensed solvent to a temperature of about 176° C.

The solution exits the fourth flash device and travels to a fifth rising film evaporator. The fifth rising film evaporator has an evaporation surface area of about 10 ft$^2$ and is held at temperature of about 226° C. at a pressure of about 1 torr. Thereafter, the solution exits the fifth rising film evaporator at a temperature of about 226° C. and enters the top of a failing film stripper. The falling film stripper is held at a temperature of about 226° C. at a pressure of about 1 torr. A vacuum pump captures the vaporized solvent that is removed in the falling film stripper and the fifth rising film evaporator. The vacuum pump is held at about 0.5 torr. The vaporized solvent travels from the vacuum pump to a fifth condenser. The fifth condenser is sized at 75 ft$^2$ and employs cooling water to condense the vaporized solvent and bring the condensed solvent to a temperature of about 176° C.

Nitrogen from a nitrogen sparger is introduced to the solution traveling through the falling film stripper at a rate of about 9 kg/hr. After sparging, the macrocyclic oligoester product has a temperature of about 226° C. and contains less than 100 ppm solvent. The macrocyclic oligoester exits the process at a rate of about 181 kg/hr.

Alternatively, a single flash device or a single condenser is employed in place of two or more of the flash devices and two or more of the condensers that are described. A single flash device may be employed in the place of the second, third, and fourth flash devices described above. A single flash device may house three distinct conduits for the solutions exiting the second, third, and fourth rising film evaporators. Such a flash device may have three conduits that are adjacent to one another. The flash device may also be constructed so that the conduit for the solution exiting the third rising film evaporator is placed inside the conduit for the solution exiting the second rising film evaporator, and the conduit for the solution exiting the fourth rising film evaporator is placed inside the conduit for the solution exiting the third rising film evaporator. A single condenser (e.g., a condenser with a 500 ft$^2$ area) may be employed in the place of the second, third, and fourth condenser described above.

Each of the patent and patent application documents disclosed hereinabove are incorporated by reference herein in their entirety.

Variations, modifications, and other implementations of what is described herein will occur to those of ordinary skill in the art without departing from the spirit and the scope of the invention as claimed.

What is claimed is:

1. A process for shaping a partially-crystallized macrocyclic oligoester, the process comprising the steps of:
   (a) isolating a substantially solvent-free molten macrocyclic oligoester from a solution comprising macrocyclic oligoester and solvent, the macrocyclic oligoester comprising a structural repeat unit of formula (I):

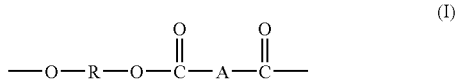

(I)

wherein R is an alkylene, a cycloalkylene, or a mono- or polyoxyalkylene group and A is a divalent aromatic or alicyclic group,
   wherein the substantially solvent-free molten macrocyclic oligoester has a solvent content of less than 200 ppm;
   (b) shearing the substantially solvent-free molten macrocyclic oligoester to form a partially-crystallized macrocyclic oligoester; and
   (c) shaping the partially-crystallized macrocyclic oligoester.

2. The process of claim 1 wherein each of step (b) and step (c) independently is continuous.

3. The process of claim 1 wherein step (b) comprises shearing the substantially solvent free macrocyclic oligoester at a temperature below the melting point of the macrocyclic oligoester.

4. The process of claim 3 wherein step (b) is conducted in a shear mixer at a shear mixer temperature between about 100° C. and about 165° C.

5. The process of claim 4 wherein step (b) is conducted in a shear mixer at a temperature between about 145° C. and about 155° C.

6. The process of claim 1 wherein shearing the substantially solvent free molten macrocyclic oligoester comprises extruding the substantially solvent free molten macrocyclic oligoester at a temperature below the melting point of the macrocyclic oligoester.

7. The process of claim 6 wherein step (b) is conducted in an extruder at a temperature between about 100° C. and about 165° C.

8. The process of claim 7 wherein step (b) is conducted in an extruder at a temperature between about 145° C. and about 155° C.

9. The process of claim 1 wherein step (c) comprises shaping the partially-crystallized macrocyclic oligoester into a shape selected from the group consisting of a pellet, a pastille, and a flake.

10. The process of claim 1 comprising the step of collecting the product of step (c).

11. The process of claim 1 comprising adding at least one additive to the substantially solvent-free molten macrocyclic oligoester.

12. The process of claim 11 wherein the at least one additive is selected from the group consisting of a colorant, a pigment, a magnetic material, an anti-oxidant, a UV stabilizer, a plasticizer, a fire-retardant, lubricant, and a mold releaser.

13. The process of claim 11 wherein the at least one additive is selected from the group consisting of fumed silicate, titanium dioxide, calcium carbonate, chopped fibers, fly ash, glass microspheres, micro-balloons, crushed stone, nanoclay, linear polymers, and monomers.

14. The process of claim 1 comprising adding a catalyst to the substantially solvent-free molten macrocyclic oligoester.

15. A process for formulating a macrocyclic oligoester, the process comprising the steps of:
   (a) providing a solution comprising a macrocyclic oligoester and a solvent, the macrocyclic oligoester comprising a structural repeat unit of formula (I):

(I)

wherein R is an alkylene, a cycloalkylene, or a mono- or polyoxyalkylene group and A is a divalent aromatic or alicyclic group;
   (b) removing continuously the solvent at an elevated temperature between about 180° C. and about 200° C., and a pressure between about atmospheric pressure and about 10 torr, to produce a substantially solvent-free molten macrocyclic oligoester, wherein the substantially solvent-free molten macrocyclic oligoester has a solvent content of less than 200 ppm;
   (c) shearing the substantially solvent-free molten macrocyclic oligoester at a temperature below the melting point of the molten macrocyclic oligoester to form a partially-crystallized macrocyclic oligoester; and
   (d) shaping the partially-crystallized macrocyclic oligoester into a shape selected from the group consisting of a pellet, a pastille, and a flake.

16. The process of claim 15 wherein step (b) comprises using a first rising film evaporator; a first flash device; a first condenser; a second rising film evaporator; a second flash device; a second condenser; a liquid receiver; a sparger; and a falling film stripper.

17. The process of claim 15 wherein step (b) comprises using a first short path evaporator; a first flash device; a first condenser; a second short path evaporator; a second flash device; a second condenser; a liquid receiver; and a falling film stripper.

18. The process of claim 1 wherein the substantially solvent-free macrocyclic oligoester provided in step (a) has solvent content less than 100 ppm.

19. The process of claim 1 wherein the substantially solvent-free macrocyclic oligoester provided in step (a) has solvent content less than 50 ppm.

20. The process of claim 1 wherein the substantially solvent-free macrocyclic oligoester provided in step (a) has solvent content less than 10 ppm.

21. The process of claim 15 wherein the substantially solvent-free macrocyclic oligoester produced in step (b) has solvent content less than 100 ppm.

22. The process of claim 15 wherein the substantially solvent-free macrocyclic oligoester produced in step (b) has solvent content less than 50 ppm.

23. The process of claim 15 wherein the substantially solvent-free macrocyclic oligoester produced in step (b) has solvent content less than 10 ppm.

\* \* \* \* \*